US011065778B2

(12) United States Patent
Sasaki

(10) Patent No.: US 11,065,778 B2
(45) Date of Patent: Jul. 20, 2021

(54) OPTICAL FIBER CUTTER

(71) Applicant: FUJIKURA LTD., Tokyo (JP)

(72) Inventor: Katsumi Sasaki, Sakura (JP)

(73) Assignee: Fujikura Ltd., Tokyo (JP)

(*) Notice: Subject to any disclaimer, the term of this patent is extended or adjusted under 35 U.S.C. 154(b) by 92 days.

(21) Appl. No.: 15/553,818

(22) PCT Filed: Apr. 7, 2017

(86) PCT No.: PCT/JP2017/014539
§ 371 (c)(1),
(2) Date: Aug. 25, 2017

(87) PCT Pub. No.: WO2018/173301
PCT Pub. Date: Sep. 27, 2018

(65) Prior Publication Data
US 2018/0272552 A1    Sep. 27, 2018

(30) Foreign Application Priority Data
Mar. 24, 2017 (JP) .............................. JP2017-059454

(51) Int. Cl.
*B26F 3/00* (2006.01)
*B26D 3/08* (2006.01)
(Continued)

(52) U.S. Cl.
CPC .............. *B26F 3/002* (2013.01); *B26D 1/185* (2013.01); *B26D 3/08* (2013.01); *B26D 7/02* (2013.01); *G02B 6/25* (2013.01)

(58) Field of Classification Search
CPC ................ B26F 3/02; B26D 3/08; B26D 7/02
See application file for complete search history.

(56) References Cited

U.S. PATENT DOCUMENTS 4,040,313 A * 8/1977 Lustgraaf ............... B23D 63/14
76/37
4,730,763 A   3/1988 Smith
(Continued)

FOREIGN PATENT DOCUMENTS

CN       2341782 Y    10/1999
CN      101210980 A    7/2008
(Continued)

OTHER PUBLICATIONS

Office Action issued in corresponding Korean Patent Application No. 10-2017-7023087 dated Dec. 3, 2018 (5 pages).
(Continued)

*Primary Examiner* — Ghassem Alie
*Assistant Examiner* — Fernando A Ayala
(74) *Attorney, Agent, or Firm* — Osha Bergman Watanabe & Burton LLP

(57) ABSTRACT

An optical fiber cutter includes a base that includes a pair of clamps, a blade member moving base that includes a disk-shaped blade member and is configured to move the blade member and bring an outer circumferential edge of the blade member into contact with a surface of the optical fiber, and a pressing that press-bends a scratched portion of the optical fiber to cut the optical fiber. The blade member is rotatably fixed to the blade member moving base to change a position of the outer circumferential edge to be in contact with the optical fiber. The base further includes a rotating member that is rotatably fixed to the base and configured to rotate to transmit power to rotate the blade member, and power transmission between the blade member and the rotating member is releasable.

11 Claims, 13 Drawing Sheets

(51) Int. Cl.
*B26D 7/02* (2006.01)
*B26D 1/18* (2006.01)
*G02B 6/25* (2006.01)

(56) References Cited

U.S. PATENT DOCUMENTS

| | | | |
|---|---|---|---|
| 5,253,412 A | 10/1993 | Fukuoka et al. | |
| 2002/0064355 A1 | 5/2002 | Ware et al. | |
| 2006/0201986 A1* | 9/2006 | Sasaki | B26D 3/08 225/105 |
| 2012/0060664 A1* | 3/2012 | Ha | G01N 1/06 83/591 |
| 2013/0255084 A1* | 10/2013 | Hasegawa | G02B 6/25 30/122 |
| 2014/0000434 A1* | 1/2014 | Hasegawa | G02B 6/25 83/887 |
| 2014/0299645 A1* | 10/2014 | Lurie | G02B 6/25 225/96 |
| 2015/0323740 A1 | 11/2015 | Zhao | |
| 2015/0331190 A1* | 11/2015 | Li | G02B 6/25 65/484 |
| 2016/0223752 A1* | 8/2016 | Sasaki | G02B 6/3616 |
| 2017/0235050 A1* | 8/2017 | Kurino | G02B 6/25 83/887 |
| 2018/0259711 A1* | 9/2018 | Kawanishi | B26D 1/18 |

FOREIGN PATENT DOCUMENTS

| | | |
|---|---|---|
| CN | 102207728 A | 10/2011 |
| CN | 103443672 A | 12/2013 |
| CN | 103529515 A | 1/2014 |
| CN | 206892394 U | 1/2018 |
| JP | S61-61104 A | 3/1986 |
| JP | H5-232327 A | 9/1993 |
| JP | H5-232346 A | 9/1993 |
| JP | H06-186436 A | 7/1994 |
| JP | 2012-194465 A | 10/2012 |
| KR | 10-2014-0016942 A | 2/2014 |
| KR | 10-2014-0124717 A | 10/2014 |

OTHER PUBLICATIONS

Decision of Rejection in corresponding Japanese Patent Application No. 2017-059454 dated Sep. 26, 2017 (3 pages).
Notice of Allowance issued in corresponding Japanese Application No. 2017-223118 dated Dec. 22, 2017 (3 pages).
Office Action in corresponding Japanese Patent Application No. 2017-059454 dated Jun. 13, 2017 (3 pages).
Extended European Search Report issued in corresponding European Patent Application 17752271.1 dated Mar. 26, 2019 (8 pages).

* cited by examiner

OPTICAL FIBER CUTTER

TECHNICAL FIELD

One or more embodiments of the present invention relate to an optical fiber cutter.

CROSS-REFERENCE TO RELATED APPLICATIONS

This application claims priority from Japanese Patent Application No. 2017-059454, filed Mar. 24, 2017, the contents of which are incorporated herein by reference in their entirety.

BACKGROUND

In an optical fiber cutter, when cutting an optical fiber (an optical fiber core), first, a blade member is brought into contact with the optical fiber to form an initial scratch on a surface of the optical fiber. Thereafter, the optical fiber is cut by press-bending a region in which the initial scratch is formed on the optical fiber. The blade member wears each time when the blade member forms the initial scratch on the optical fiber. Therefore, conventionally, it has been conceived to change the region of the blade member to be in contact with the optical fiber (see Patent Document 1, for example).

Patent Document 1 discloses a device which changes a contact portion of a blade member with respect to an optical fiber by rotating the blade member by a driving force of a motor (a driving source).

PRIOR ART DOCUMENTS

Patent Documents

[Patent Document 1] Japanese Unexamined Patent Application, First Publication No. H06-186436

However, in a device disclosed in Patent Document 1, a cam that rotates a blade member is provided in a blade member moving base which moves the blade member that scratches a surface of an optical fiber. As a result, a mechanism that rotates the blade member is complicated due to a requirement such as lengthening a wiring connected to a motor (a driving source) to provide the motor that drives the cam in the blade member moving base.

SUMMARY

One or more embodiments of the invention provide an optical fiber cutter in which a mechanism that rotates the blade member can be simplified.

An optical fiber cutter according to one or more embodiments of the invention includes a base that includes a pair of clamps disposed with an interval therebetween in a longitudinal direction of an optical fiber, a blade member moving base that includes a disk-shaped blade member and is configured to move the blade member between the pair of clamps and bring an outer circumferential edge of the blade member into contact with a surface of the optical fiber to scratch the surface of the optical fiber, and a pressing that press-bends a scratched portion of the optical fiber to cut the optical fiber, wherein the blade member is rotatably fixed to the blade member moving base to change a position of the outer circumferential edge to be in contact with the optical fiber, the base further includes a rotating member that is rotatably fixed to the base and configured to rotate to transmit power to rotate the blade member, and power transmission between the blade member and the rotating member is releasable.

In the optical fiber cutter, power transmission between the blade member and the rotating member may be possible only when the blade member moving base has moved to a predetermined position.

In the optical fiber cutter, power transmission between the blade member and the rotating member may be released according to a rotational position of the rotating member.

In the optical fiber cutter, power transmission between the blade member and the rotating member may be released when a torque acting on the blade member is equal to or greater than a predetermined value.

In the optical fiber cutter, the rotating member may be rotated by an electromagnetic force.

In the optical fiber cutter, the blade member moving base may further include a manual operation rotating member that is rotatably fixed to the blade member moving base and configured to transmit power by rotation by a user to rotate the blade member, and the base may further include a window through which the manual operation rotating member of the blade member moving base accommodated therein is exposed to the outside.

In the optical fiber cutter, the window may be provided on a bottom surface or a side surface of the base.

In the optical fiber cutter, the base may further include an erroneous rotation prevention cover that covers the manual operation rotating member.

In the optical fiber cutter, the manual operation rotating member may be exposed from the window to the outside only when the blade member moving base has moved to a predetermined position.

The optical fiber cutter may further include a holding mechanism that holds at least one of the blade member and the rotating member at a predetermined rotational position.

The optical fiber cutter may further include a holding mechanism that holds at least one of the blade member, the rotating member, and the manual operation rotating member at a predetermined rotational position.

According to one or more embodiments of the present invention, when rotation of a blade member is driven by a driving source such as a motor, the driving source may be connected to a rotating member provided in the base. That is, the driving source can be provided in the base. Therefore, it is possible to simplify a mechanism that rotates the blade member, such as by shortening a wiring (an electric wiring) connected to the driving source.

EMBODIMENTS FOR CARRYING OUT THE INVENTION

Hereinafter, embodiments of an optical fiber cutter according to the invention will be described with reference to FIGS. 1 to 10.

Figure 1:
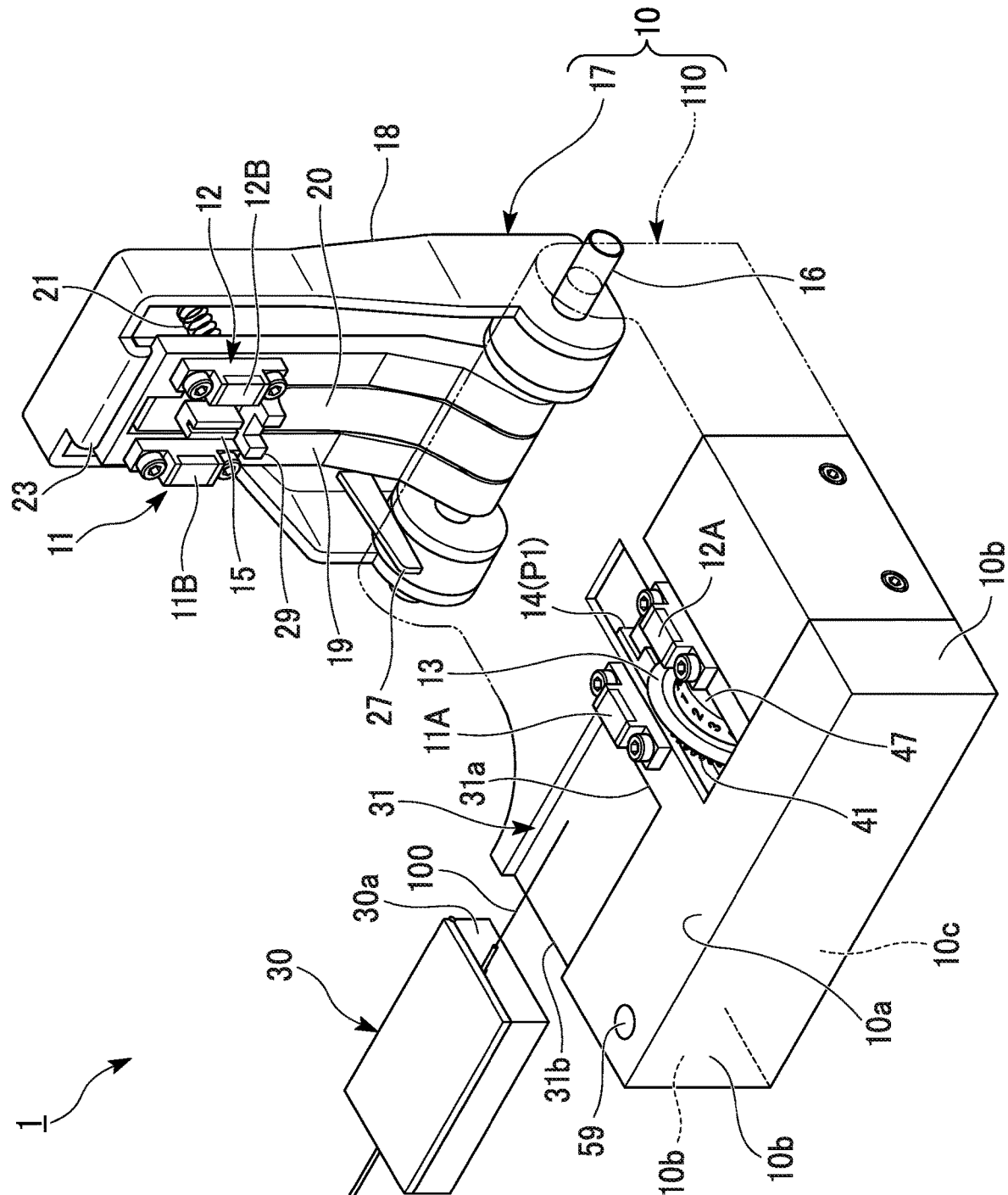
FIG. 1 is a perspective view showing an optical fiber cutter according to one or more embodiments of the invention.
Figure 2:
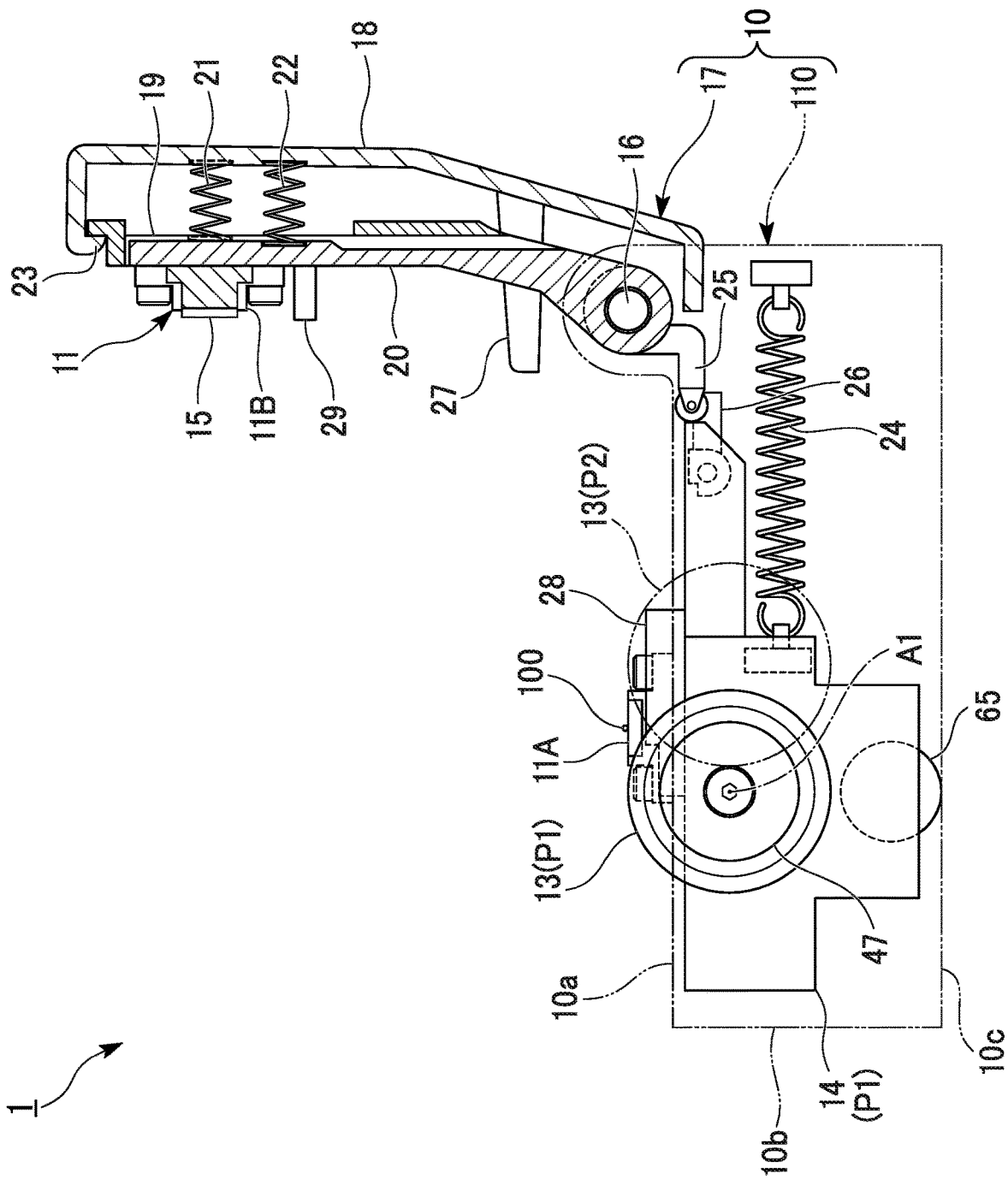
FIG. 2 is a cross-sectional view showing an optical fiber cutter according to one or more embodiments of the invention.

As shown in FIGS. 1 and 2, an optical fiber cutter 1 according to one or more embodiments includes a base 10 including a pair of clamps 11 and 12, a blade member moving base 14 including a disk-shaped blade member 13, and a pressing member 15. The base 10 includes a base portion 110 and a lid 17. The lid 17 is attached to the base portion 110 to be rotatable about a rotating shaft 16.

The pair of clamps 11 and 12 are disposed with an interval therebetween in a longitudinal direction of an optical fiber 100. The pair of clamps 11 and 12 grip the optical fiber 100. The clamps 11 and 12 respectively include lower clamps 11A and 12A and upper clamps 11B and 12B which sandwich the optical fiber 100 in a vertical direction (in a vertical direction in FIGS. 1 and 2). Elastic pads such as rubber may be provided at portions in which the lower clamps 11A and 12A and the upper clamps 11B and 12B face each other (portions at which the optical fiber 100 is sandwiched).

In one or more embodiments, the pair of lower clamps 11A and 12A are disposed on an upper surface 10a of the base portion 110. On the other hand, the pair of upper clamps 11B and 12B are provided on the lid 17.

When the lid 17 is closed to the base portion 110, the optical fiber 100 can be gripped by the pair of clamps 11 and 12.

The blade member moving base 14 (hereinafter, referred to as a blade base 14) moves the blade member 13 between the pair of clamps 11 and 12 and brings an outer circumferential edge of the blade member 13 into contact with a surface of the optical fiber 100 to scratch it. The blade base 14 is provided to be movable with respect to the base 10 so that the blade member 13 passes between the pair of clamps 11 and 12. In one or more embodiments, the blade base 14 is provided to be movable with respect to the base portion 110.

A movement direction of the blade base 14 may be a direction intersecting a longitudinal direction of the optical fiber 100 gripped by the pair of clamps 11 and 12 so that at least a surface of the optical fiber 100 can be scratched by the blade member 13. In one or more embodiments, the movement direction of the blade base 14 is a direction perpendicular to the longitudinal direction of the optical fiber 100 gripped by the pair of clamps 11 and 12.

In one or more embodiments, the blade base 14 is accommodated inside the base portion 110. In accordance with this, most of the blade member 13 is disposed inside the base portion 110 and only part of the blade member 13 protrudes from the upper surface 10a of the base portion 110. Therefore, the movement direction of the blade base 14 is a direction along the upper surface 10a of the base portion 110.

Figure 3:
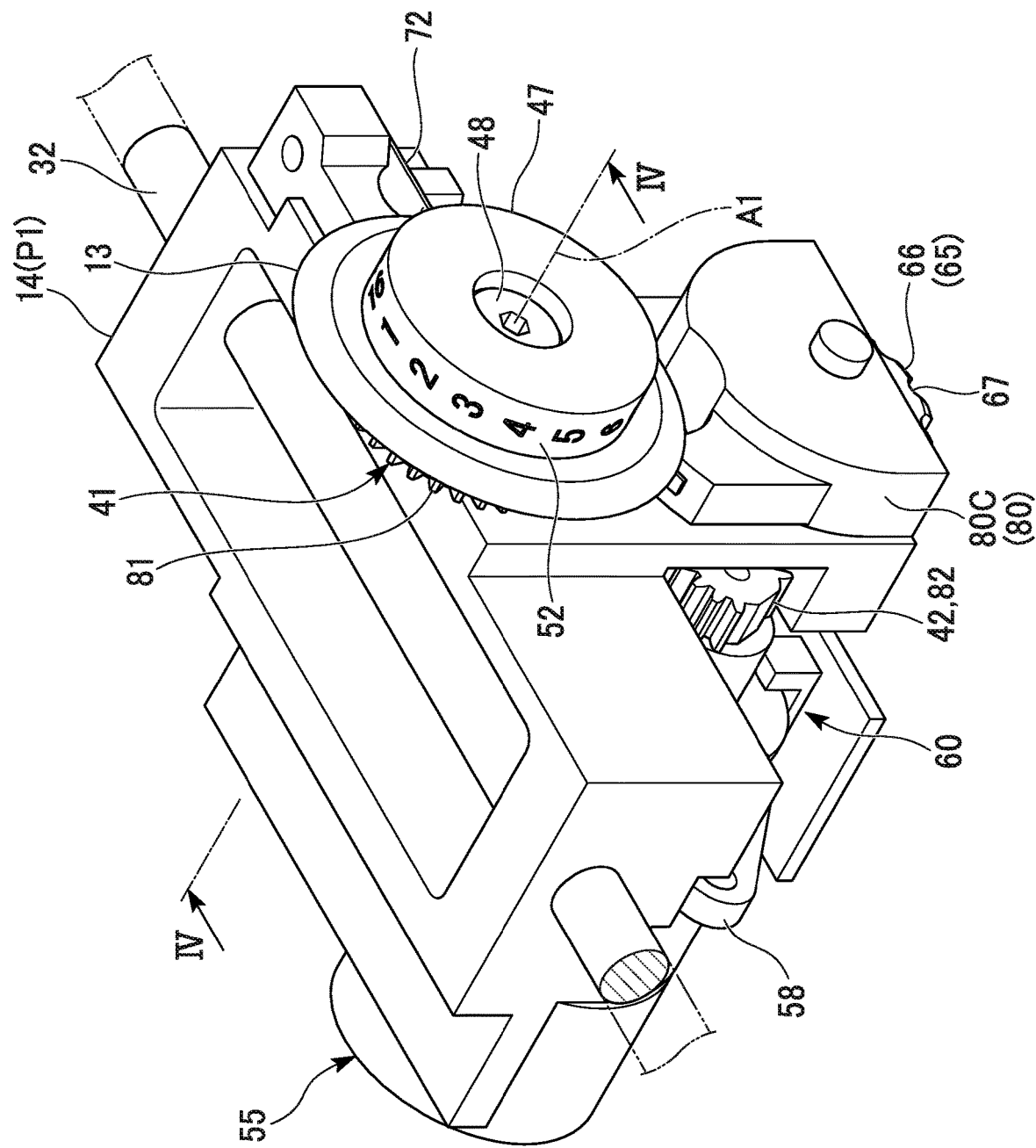
FIG. 3 is a perspective view showing a rotating member attached to a base, a blade member moving base disposed at a first position, and a blade member, a blade member fixing member, a manual operation rotating member, a hold-down member, and the like which are attached to the blade member moving base, in the optical fiber cutter of FIGS. 1 and 2.

As shown in FIG. 3, a shaft 32 is inserted into the blade base 14 of one or more embodiments. The shaft 32 is attached inside the base portion 110 and is a track that moves the blade base 14 in a predetermined linear direction with respect to the base portion 110. That is, the blade base 14 is movable in a longitudinal direction of the shaft 32.

As shown in FIGS. 1 to 3, the disk-shaped blade member 13 provided in the above-described blade base 14 is disposed such that the disk plane of the blade member follows the movement direction of the blade base 14. In one or more embodiments, the disk plane of the blade member 13 is perpendicular to the longitudinal direction of the optical fiber 100 (to an arrangement direction of the pair of clamps 11 and 12).

The outer circumferential edge (blade tip) of the blade member 13 comes into contact with the surface of the optical fiber 100 gripped by the pair of clamps 11 and 12 in the middle of a movement path (during the course of the movement) and thus the blade member 13 scratches the surface of the optical fiber 100.

The blade member 13 is rotatably fixed to the blade base 14 so that a position of the outer circumferential edge to be in contact with the surface of the optical fiber 100 is changed. Specifically, the blade member 13 is rotatable about an axis A1 (a line extending in a direction perpendicular to the paper surface in FIG. 2) of the blade member 13. Therefore, a position of the outer circumferential edge of the blade member 13 to be in contact with the optical fiber 100 can be changed.

When the optical fiber 100 is scratched, a predetermined length (hereinafter, referred to as a contact length of the blade member 13) in a circumferential direction of the outer circumferential edge of the blade member 13 comes into contact with the surface of the optical fiber 100. Therefore, when changing a position of the outer circumferential edge of the blade member 13 to be in contact with the optical fiber 100, it is possible to rotate the blade member 13 in angle units corresponding to the contact length of the blade member 13. It is possible that the contact length of the blade member 13 be a length obtained by equally dividing the entire circumference of the outer circumferential edge of the blade member 13 into a plurality of regions. The contact length of the blade member 13 in one or more embodiments is a length obtained by dividing the entire circumference of the outer circumferential edge of the blade member 13 into 16 equal sections.

As shown in FIGS. 1 and 2, the pressing member 15 press-bends a scratched portion of the optical fiber 100 scratched by the blade member 13 to cut the optical fiber 100. In one or more embodiments, the pressing member 15 is provided on the lid 17 similarly to the above-described upper clamps 11B and 12B. When the lid 17 is closed to the base portion 110, the optical fiber 100 can be press-bent by the pressing member 15.

In one or more embodiments, the rotating shaft 16 of the lid 17 is parallel to the axis A1 of the blade member 13, that is, perpendicular to the movement direction of the blade member 13 and the blade base 14.

The lid 17 of one or more embodiments includes a lid main body 18, a clamp attachment portion 19 to which the pair of upper clamps 11B and 12B are attached, and a pressing member attachment portion 20 to which pressing member 15 is attached. The lid main body 18, the clamp attachment portion 19, and the pressing member attachment portion 20 are attached to the base portion 110 to be independently rotatable to each other about the rotating shaft 16. The clamp attachment portion 19 and the pressing member attachment portion 20 are positioned on the front side of the lid main body 18 in a direction of closing the lid 17.

A first spring 21 is provided between the lid main body 18 and the clamp attachment portion 19. A gripping force of the pair of clamps 11 and 12 with respect to the optical fiber 100 can be secured by an elastic force of the first spring 21. A second spring 22 is provided between the lid main body 18 and the pressing member attachment portion 20. The second spring 22 can apply a press-bending force to the optical fiber 100 by an urging force of the pressing member 15.

The clamp attachment portion 19 is locked into the lid main body 18 by a locking claw 23 formed in the lid main body 18. Therefore, the clamp attachment portion 19 is prevented from being excessively separated from the lid main body 18 by an urging force of the first spring 21. Also, the pressing member attachment portion 20 is locked into the clamp attachment portion 19 by a locking portion (not shown) formed in the clamp attachment portion 19. Therefore, the pressing member attachment portion 20 is prevented from being excessively separated from the lid main body 18 and the clamp attachment portion 19 by an urging force of the second spring 22.

Furthermore, the optical fiber cutter 1 of one or more embodiments is configured such that the processes of gripping, scratching, press-bending, and cutting the optical fiber 100 are realized as a series of operations by merely closing the lid 17 with respect to the base portion 110. This point will be described below.

A spring 24 that moves the blade base 14 by an elastic force is provided inside the base portion 110. One end of the spring 24 is held by the blade base 14 and the other end of the spring 24 is held by the base portion 110. The spring 24 expands and contracts in the movement direction of the blade base 14 as the blade base 14 moves.

Inside the base portion 110, a push-in protrusion 25 formed integrally with the lid 17 is disposed. When the lid 17 is open with respect to the base portion 110, the push-in protrusion 25 pushes and moves the blade base 14 in a direction away from the rotating shaft 16 of the lid 17. At this time, the spring 24 may be elastically contracted, but the spring 24 elastically expands in one or more embodiments.

Also, a locking member 26 which locks the lid 17 into the blade base 14 in a state in which the lid 17 is open with respect to the base portion 110 is provided inside the base portion 110. The locking member 26 is locked into the blade base 14 to hold the blade base 14 at a position pushed by the push-in protrusion 25 (the position shown in FIGS. 1 and 2).

On the other hand, a release protrusion 27 is provided in the lid 17. When the lid 17 is closed with respect to the base portion 110, the release protrusion 27 is pressed against the locking member 26 and releases the locked state of the blade base 14 due to the locking member 26. That is, when the lid 17 is closed with respect to the base portion 110, the blade base 14 (and the blade member 13) is moved in a direction of coming closer to the rotating shaft 16 of the lid 17 by an elastic force of the spring 24 so that the blade base 14 passes between the pair of clamps 11 and 12.

A timing of releasing the locked state of the blade base 14 due to the locking member 26 may be any time after the optical fiber 100 is held by the pair of clamps 11 and 12 when the lid 17 is closed with respect to the base portion 110. As a result, the surface of the optical fiber 100 can be scratched by the blade member 13 in a state in which the optical fiber 100 is gripped by the pair of clamps 11 and 12.

Also, positioning protrusions 28 and 29 to be in contact with each other when the lid 17 is closed with respect to the base portion 110 are provided in the blade base 14 and the pressing member attachment portion 20. In a state in which the positioning protrusions 28 and 29 of the blade base 14 and the pressing member attachment portion 20 are in contact with each other, the pressing member 15 is positioned above the optical fiber 100 with a space therebetween.

A timing of releasing the contact state between the positioning protrusions 28 and 29 may be any time after the locked state of the blade base 14 due to the locking member 26 described above is released and the blade base 14 is moved in a direction of coming closer to the rotating shaft 16 of the lid 17 to pass between the pair of clamps 11 and 12 by the elastic force of the spring 24, that is, after the surface of the optical fiber 100 is scratched by the blade member 13.

When the contact between the positioning protrusions 28 and 29 is released, the pressing member 15 is pressed against the optical fiber 100 by an elastic force of the second spring 22 disposed between the pressing member attachment portion 20 and the lid main body 18. Therefore, the scratch in the optical fiber 100 grows and thus the optical fiber 100 is cut.

Also, the optical fiber cutter 1 of one or more embodiments has a structure in which the optical fiber 100 is held on the pair of lower clamps 11A and 12A until the lid 17 is closed with respect to the base portion 110. Specifically, the optical fiber cutter 1 of one or more embodiments includes a fiber holder 30 which holds the optical fiber 100 in a state of being sandwiched therebetween. The fiber holder 30 can be accommodated in a positioning recess 31 formed on the upper surface 10a of the base portion 110. When the fiber holder 30 is accommodated in the positioning recess 31, the optical fiber 100 held by the fiber holder 30 can be positioned with respect to the base portion 110 and the lid 17 (the pair of clamps 11 and 12, the blade member 13, and the pressing member 15).

Specifically, the positioning recess 31 is formed in a groove shape extending in an arrangement direction of the pair of lower clamps 11A and 12A. A width of the positioning recess 31 corresponds to a width of the fiber holder 30. Therefore, in a state in which the fiber holder 30 is accommodated in the positioning recess 31, a movement of the fiber holder 30 to the base portion 110 in a width direction of the positioning recess 31 is restricted. Therefore, the optical fiber 100 held by the fiber holder 30 can be positioned with respect to the base portion 110 and the lid 17 (the pair of clamps 11 and 12, the blade member 13, and the pressing member 15) in the width direction of the positioning recess 31.

A first end 31a of the positioning recess 31 in the arrangement direction of the pair of lower clamps 11A and 12A is positioned adjacent to lower clamp 11A on one side. A front surface 30a of the fiber holder 30 that faces the lower clamp 11A on the one side can be in contact with the first end 31a of the positioning recess 31. On the other hand, a second end 31b of the positioning recess 31 is open to a side surface 10b of the base portion 110.

Therefore, when the front surface 30a of the fiber holder 30 is brought into contact with the first end 31a of the positioning recess 31, the optical fiber 100 held by the fiber holder 30 can be positioned with respect to the base portion 110 and the lid 17 (the pair of clamps 11 and 12, the blade member 13, and the pressing member 15) in a longitudinal direction of the positioning recess 31 (the arrangement direction of the pair of lower clamps 11A and 12A).

In the optical fiber cutter 1 of one or more embodiments, as shown in FIGS. 3 to 6, the base 10 described above further includes a rotating member 42. The rotating member 42 is rotatably fixed to the base 10. Also, the rotating member 42, by rotation thereof, transmits power to rotate the blade member 13. The power transmission between the blade member 13 and the rotating member 42 can be released. Hereinafter, this configuration will be described in detail.

The blade member 13 includes a blade member fixing member 41 (hereinafter, referred to as a fixing member 41). The fixing member 41, for example, may be integrally formed with the blade member 13. In one or more embodiments, the fixing member 41 is formed separately from the blade member 13 and fixed integrally to the blade member 13. Thus, the fixing member 41, together with the blade member 13, is rotatably fixed to the blade base 14.

As shown in FIGS. 4 to 7, the fixing member 41 of one or more embodiments is formed in a disk shape. A circular insertion hole 44 through which a columnar blade shaft 43 protruding from the blade base 14 is inserted is formed in a central portion of the fixing member 41 as seen in an axial direction. An inner diameter of the insertion hole 44 corresponds to an outer diameter of the blade shaft 43. Therefore, in a state in which the fixing member 41 is inserted into the blade shaft 43 of the blade base 14, the fixing member 41 is rotatable about the axis A1 with respect to the blade base 14.

Similar to the fixing member 41, the blade shaft 43 of the blade base 14 is also inserted into the blade member 13. Therefore, the blade member 13 is rotatable about the axis A1 with respect to the blade base 14.

In a state in which the fixing member 41 and the blade member 13 are attached to the blade shaft 43 of the blade base 14, the blade member 13 and the fixing member 41 are arranged to overlap in the axial direction. On facing surfaces of the blade member 13 and the fixing member 41 which face each other in the axial direction, a recessed and projected portion that locks the blade member 13 and the fixing member 41 to each other is formed. In one or more embodiments, the recessed and projected portion is constituted by a projected portion 45 formed on the facing surface of the fixing member 41 and an insertion portion 46, into which the projected portion 45 of the fixing member 41 is inserted, formed on the facing surface of the blade member 13. The insertion portion 46 of the blade member 13 may be, for example, a bottomed recessed portion, but the insertion portion 46 of the blade member 13 in one or more embodiments is a through hole penetrating in the axial direction. Since the projected portion 45 of the fixing member 41 is inserted into the insertion portion 46 of the blade member 13, the blade member 13 and the fixing member 41 are integrally rotatable with respect to the blade base 14.

Figure 4:
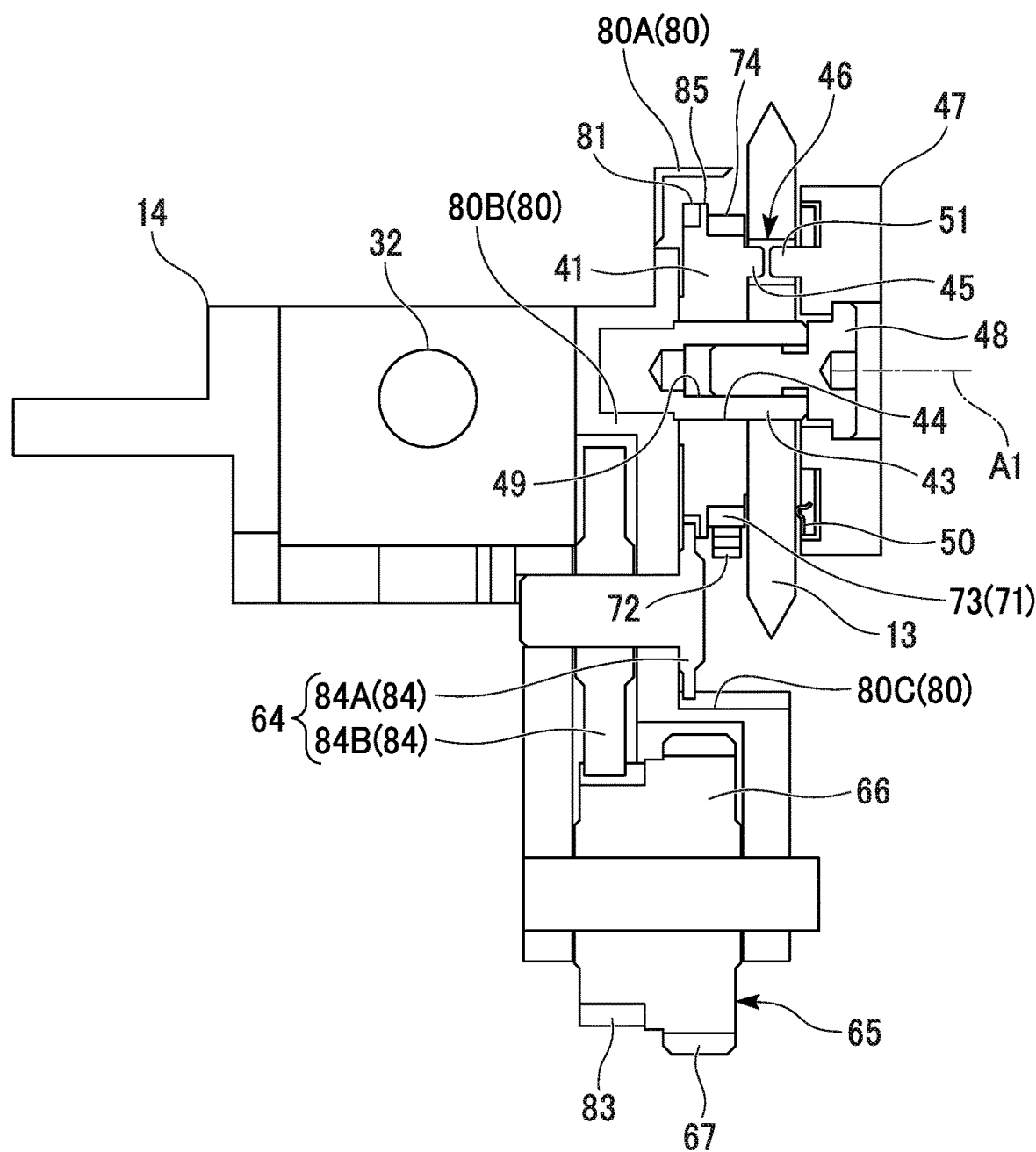
FIG. 4 is a cross-sectional view taken along line IV-IV of FIG. 3.
Figure 5:
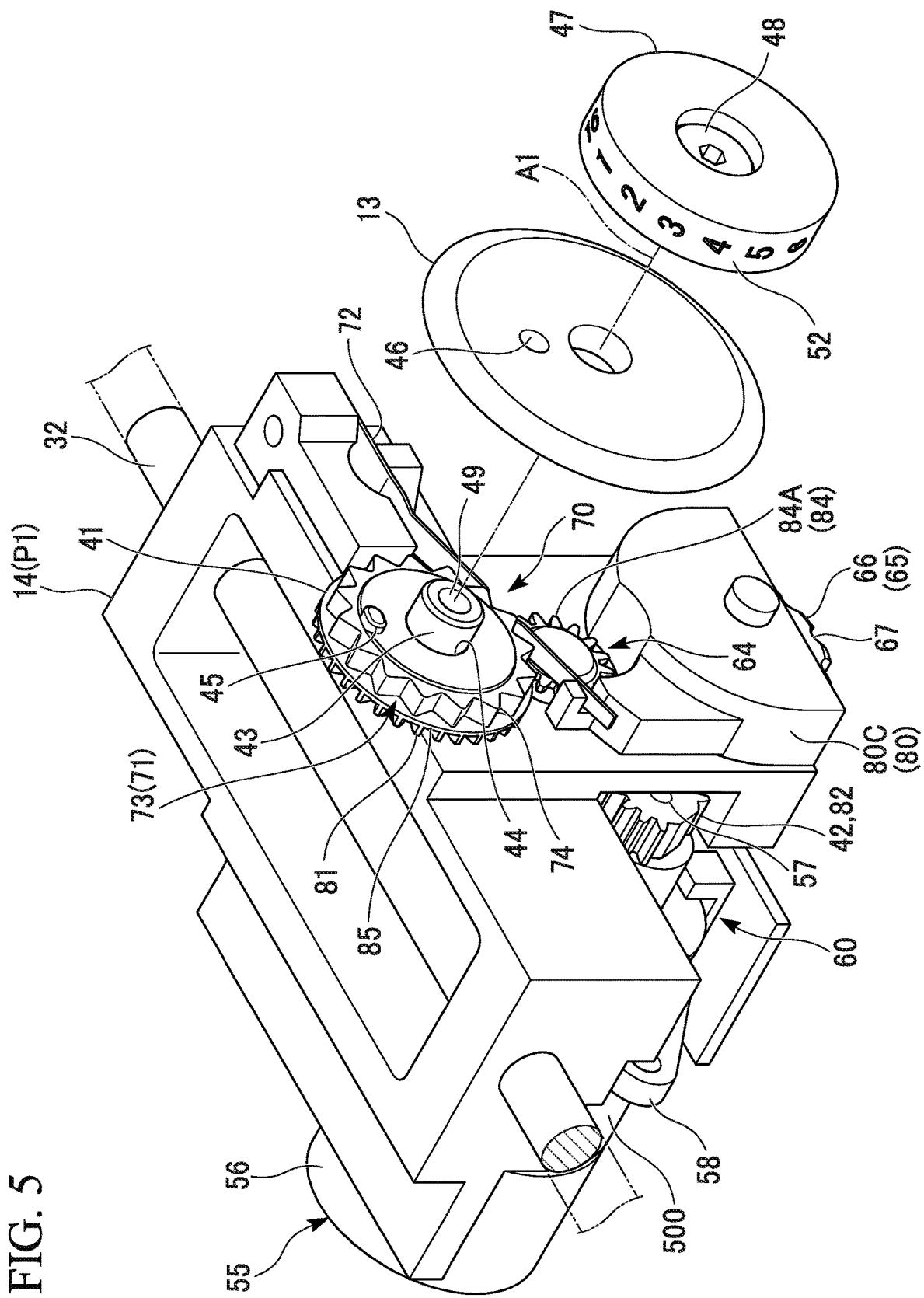
FIG. 5 is an exploded perspective view showing a state in which the blade member and the hold-down member are detached from the blade member moving base in the configuration shown in FIG. 3.
Figure 6:
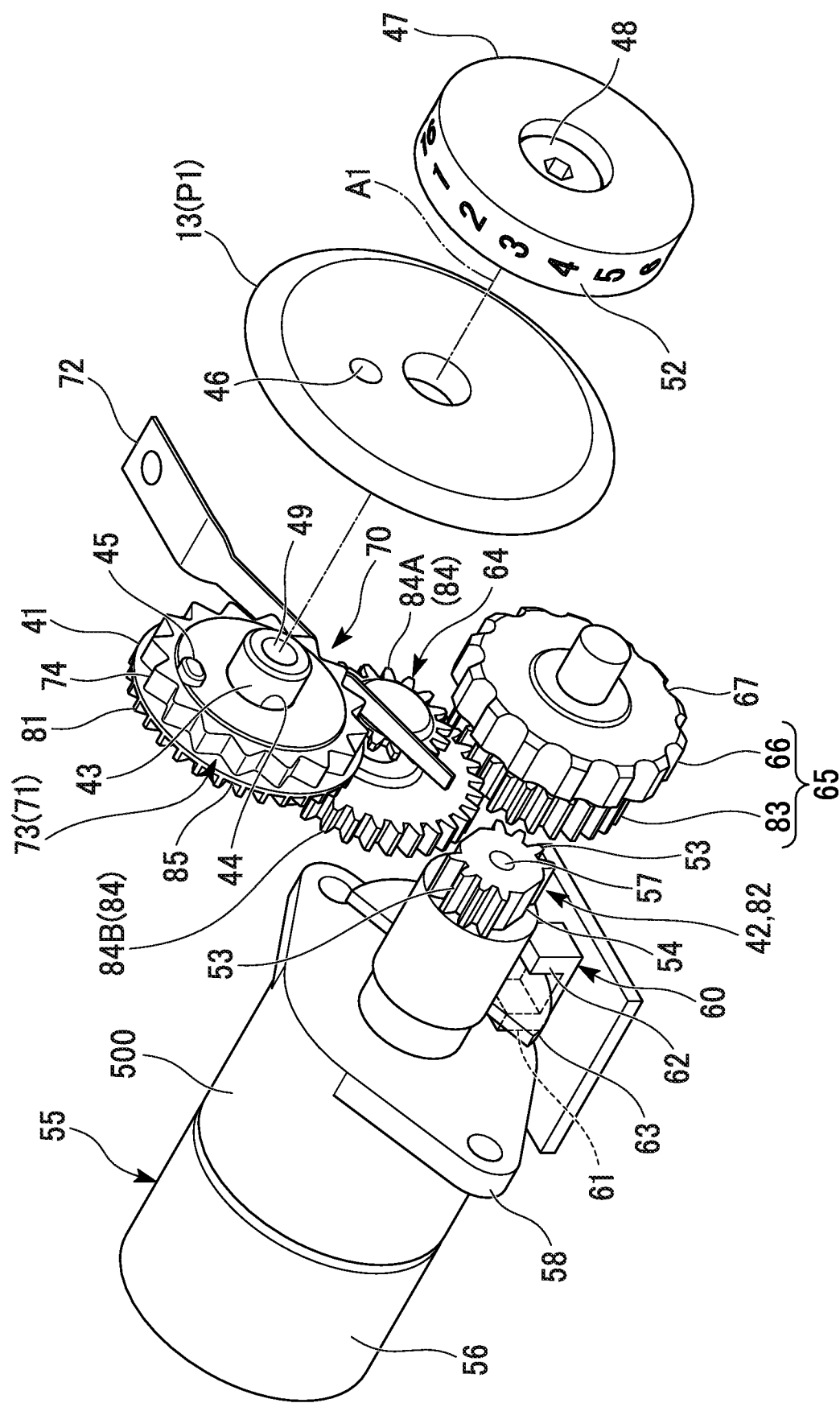
FIG. 6 is an exploded perspective view showing a state in which the blade member moving base is removed from the configuration shown in FIG. 5.
Figure 7A:
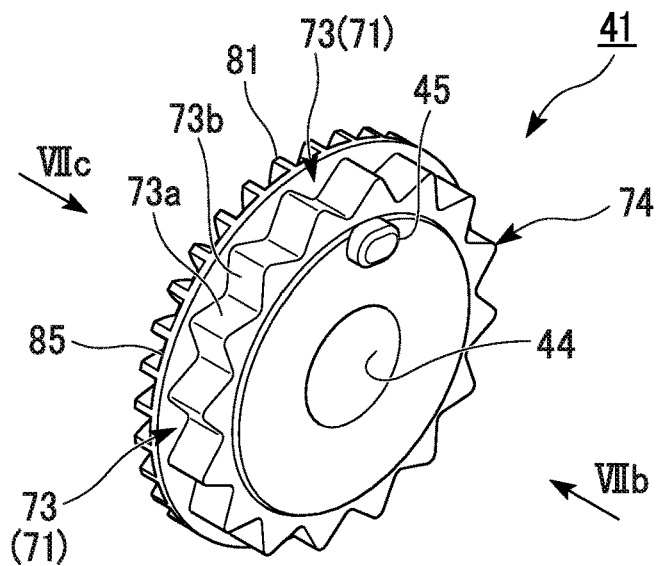
FIG. 7A is a perspective view showing a blade member fixing member provided in the optical fiber cutter according to one or more embodiments of the invention.
Figure 7B:
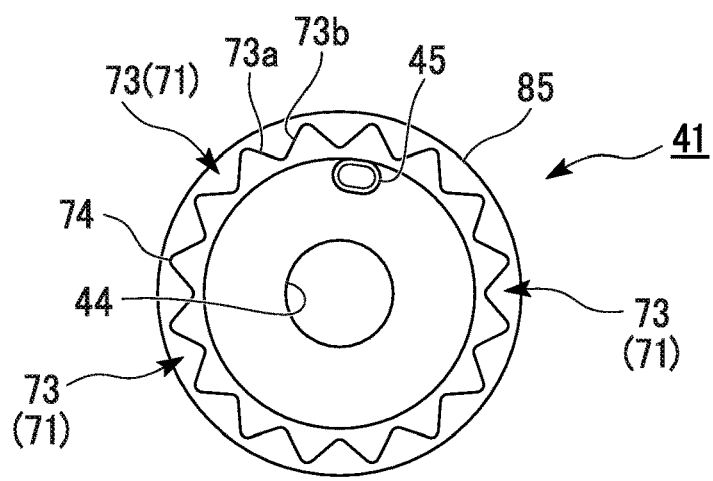
FIG. 7B is a front view showing a blade member fixing member provided in the optical fiber cutter according to one or more embodiments of the invention and is a view seen from a direction VIIb shown in FIG. 7A.
Figure 7C:
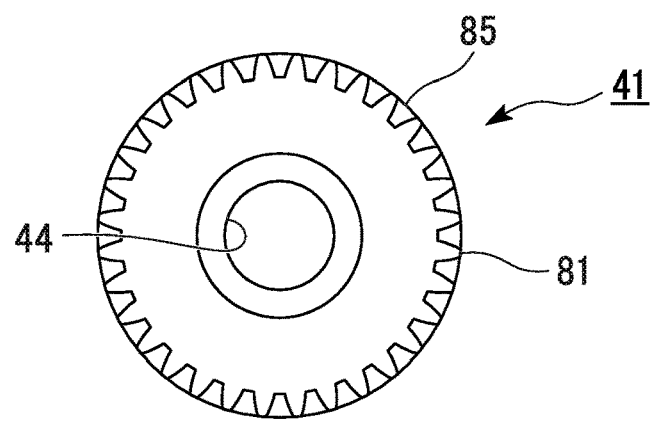
FIG. 7C is a rear view showing a blade member fixing member provided in the optical fiber cutter according to one or more embodiments of the invention and is a view seen from a direction VIIc shown in FIG. 7A.

As shown in FIGS. 4 to 6, the blade member 13 and the fixing member 41 of one or more embodiments are held to the blade base 14 by being sandwiched between the blade base 14 and a hold-down member 47 in the axial direction. Specifically, the fixing member 41 and the blade member 13 are sequentially attached to the blade shaft 43 of the blade base 14, and then a shaft portion of a screw 48 passes through the hold-down member 47 and screws into a threaded hole 49 formed in the blade shaft 43. Therefore, since the fixing member 41, the blade member 13, and hold-down member 47 are sandwiched between the blade base 14 and a head of the screw 48, the blade member 13 and the fixing member 41 can be held by the blade base 14.

As shown in FIG. 4, a spring member 50 is provided between the blade member 13 and the hold-down member 47. The spring member 50 is elastically deformed when the hold-down member 47 is pressed against the blade member 13 by the above-described screw 48 or the like and urges the blade member 13 toward the fixing member 41. Therefore, it is possible to prevent the blade member 13 attached to the blade base 14 from rattling in the axial direction.

On the hold-down member 47, a protrusion 51 which is inserted into the insertion portion 46 of the blade member 13 is formed. Therefore, the blade member 13 and the hold-down member 47 can be integrally rotated with respect to the blade base 14.

As shown in FIGS. 3, 5, and 6, a scale 52 indicating a rotational position of the blade member 13 (particularly, a position of the outer circumferential edge of the blade member 13 to be in contact with the optical fiber 100) is formed on the hold-down member 47.

As in the shown example, in the scale 52, 16 positions on the outer circumferential edge of the blade member 13 to be in contact with the optical fiber 100 may be indicated by numerals, but it is not limited thereto. The scale 52 may be formed on the outer circumferential surface of the hold-down member 47 as in the shown example, but it is not limited thereto.

The rotating member 42 is engageable with the fixing member 41 (the blade member 13) described above. In a state in which the rotating member 42 is engaged with the fixing member 41, power is transmitted to the fixing member 41 when the rotating member 42 rotates and thereby the blade member 13 and the fixing member 41 can rotate. In one or more embodiments, the rotating member 42 is disposed inside the base portion 110.

The power transmission between the blade member 13 and the rotating member 42 may not be released, for example, regardless of a rotational position (rotational angle) of the rotating member 42. That is, the rotating member 42 may be engaged with the fixing member 41 regardless of the rotational position of the rotating member 42.

In one or more embodiments, the power transmission between the blade member 13 and the rotating member 42 is released according to the rotational position of the rotating member 42. That is, the rotating member 42 of one or more embodiments is formed to be switchable between an engaged state of being engaged with the fixing member 41 and a disengaged state of being disengaged therefrom depending on the rotational position of the rotating member 42.

Figure 8:
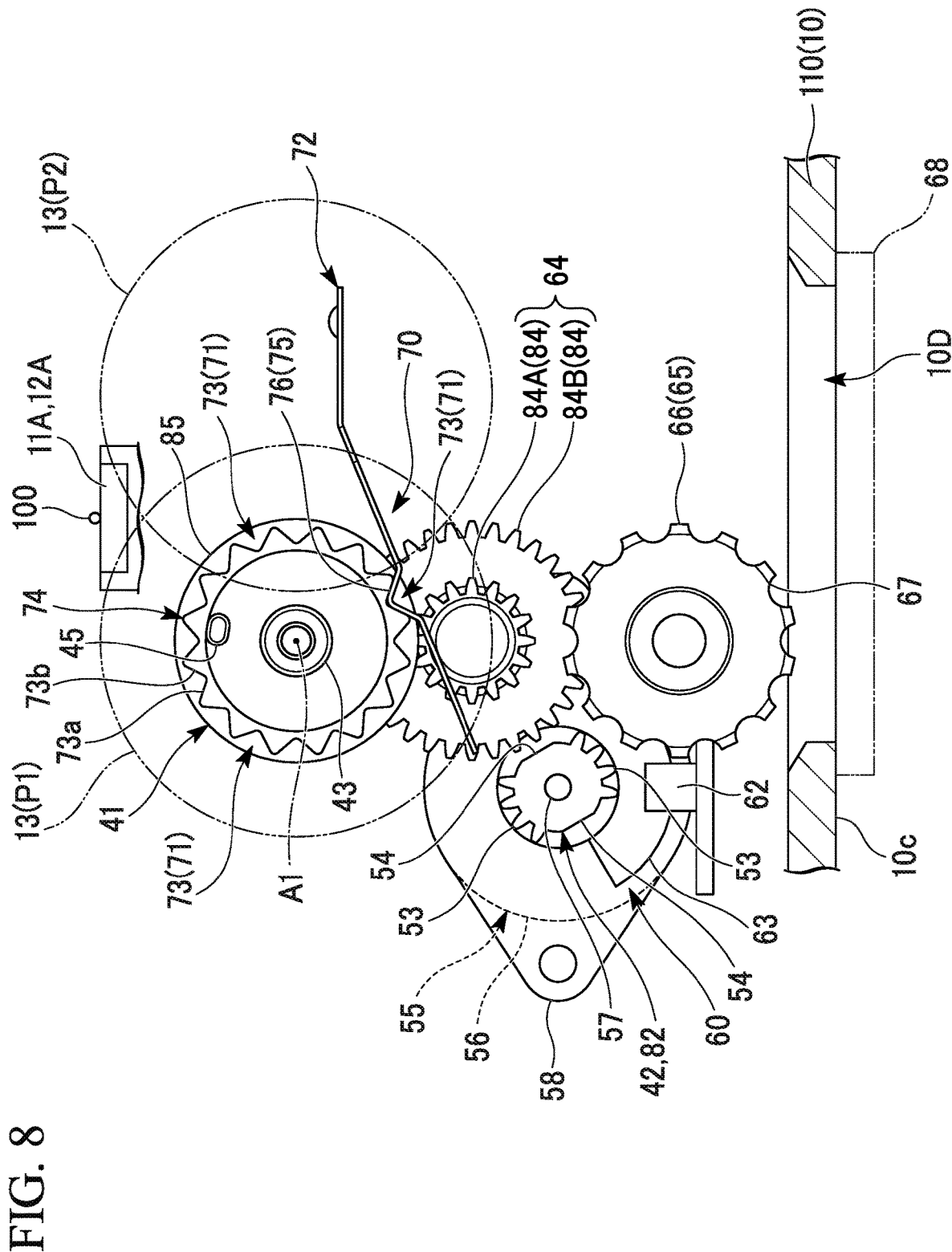
FIG. 8 is a side view showing a positional relation between the rotating member attached to the base and the blade member fixing member, the manual operation rotating member, and a relay member which are attached to the blade member moving base, in configurations shown in FIGS. 3, 5, and 6.
Figure 9:
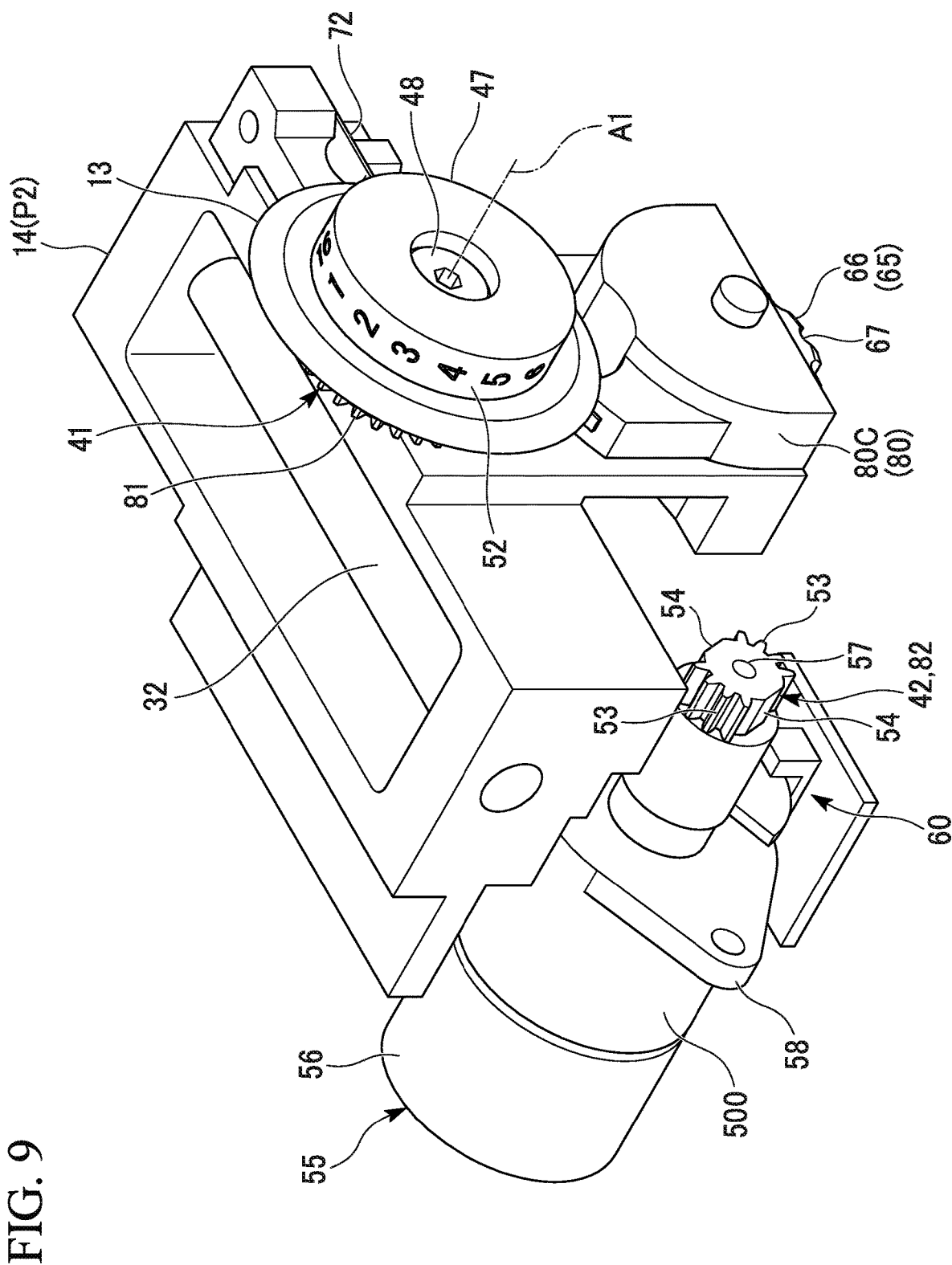
FIG. 9 is a perspective view showing a rotating member attached to the base, a blade member moving base disposed at a second position, and a blade member, a blade member fixing member, a manual operation rotating member, a hold-down member, and the like which are attached to the blade member moving base, in the optical fiber cutter of FIGS. 1 and 2.

More specifically, as shown in FIGS. 6 and 8, the rotating member 42 of one or more embodiments includes an engaging portion 53 engaging with the fixing member 41 and a non-engaging portion 54 not engaging with the fixing member 41. The engaging portion 53 and the non-engaging portion 54 are arranged in a rotational direction of the rotating member 42. That is, the engaging portion 53 is formed in a portion of a circumferential direction in the rotating member 42 of one or more embodiments. The number of engaging portions 53 may be, for example, one or a plurality thereof. When a plurality of engaging portion 53 are used, it is possible that the plurality of engaging portion 53 be arranged at regular intervals in the rotational direction of the rotating member 42. In one or more embodiments, the number of engaging portions 53 is two. Thus, according to the rotational position of the rotating member 42, it is possible to switch between the engaged state in which the fixing member 41 and the rotating member 42 are engaged and the disengaged state in which they are disengaged.

The rotating member 42 of one or more embodiments is rotated by an electromagnetic force. That is, the optical fiber cutter 1 of one or more embodiments includes a motor 55 (a driving source) which rotatably drives the rotating member 42. The motor 55 includes a motor main body 56, a motor shaft portion 57 which rotates with respect to the motor main body 56 due to the power supply or the like, and a motor speed reducer 500. The motor 55 is fixed to the base portion 110 (base 10) via an attachment member 58 or the like.

In one or more embodiments, the rotating member 42 is attached to the motor shaft portion 57. That is, the rotating member 42 of one or more embodiments is attached to be rotatable with respect to the base 10 via the motor 55.

In one or more embodiments, the motor 55 operates by operating an operation switch 59 (for example, a push button switch) provided on an outer surface of the base 10 (on the upper surface 10a of the base portion 110 in FIG. 1) as shown in FIG. 1. When the operation switch 59 is operated, the motor 55 drives the rotating member 42 to rotate so that the blade member 13 rotates by only a predetermined angle.

Also, as shown in FIGS. 6 and 8, the optical fiber cutter 1 of one or more embodiments includes a rotational position measurer 60 that measures a rotational position of the rotating member 42 and the motor shaft portion 57.

In one or more embodiments, the rotational position measurer 60 includes a light emitter 61, a light receiver 62, and a shielding plate 63 positioned between the light emitter 61 and the light receiver 62 according to the rotational position of the rotating member 42 and the motor shaft portion 57. The shielding plate 63 is formed in a semicircular shape centered on the axis A1 of the rotating member 42 and the motor shaft portion 57. The rotational position of the rotating member 42 and the motor shaft portion 57 measured by the rotational position measurer 60 is used to control the motor 55 which rotates the rotating member 42 by only a predetermined angle.

In addition, in the optical fiber cutter 1 of one or more embodiments, as shown in FIGS. 3, 5, 6, and 8 to 10, the power transmission between the blade member 13 and the rotating member 42 is possible only when the blade base 14 has moved to a predetermined position. This point will be specifically described below.

In one or more embodiments, as described above, the blade member 13 and the fixing member 41 are provided in the blade base 14, and the rotating member 42 is provided in the base 10. Also, the fixing member 41 and the rotating member 42 are arranged to be aligned in the movement direction of the blade base 14 (left and right direction in FIG. 8). As a result, the rotating member 42 is in an engaged state with the fixing member 41 only when the blade base 14 has moved to a predetermined position. Specifically, the blade base 14 is movable between a first position P1 at which the fixing member 41 and the rotating member 42 are engagable with each other as shown in FIGS. 3, 5, 6, and 8 and a second position P2 at which the fixing member 41 and the rotating member 42 are not engaged as exemplarily shown in FIGS. 9 and 10. That is, it is possible to switch between the engaged state in which the fixing member 41 and the rotating member 42 are engaged with each other and the disengaged state in which the fixing member 41 and the rotating member 42 are not engaged with each other by moving the blade base 14 between the first position P1 and the second position P2. Since the blade base 14 is omitted in FIGS. 6, 8, and 10, the first position P1 and the second position P2 of the blade base 14 are indicated by the blade member 13 attached to the blade base 14.

The first position P1 of the blade base 14 may be, for example, a position after the blade base 14 has moved to scratch the surface of the optical fiber 100 using the blade member 13 by closing the lid 17 with respect to the base portion 110. As shown in FIGS. 1 and 2, the first position P1 of the blade base 14 in one or more embodiments is a position to which the blade base 14 has moved due to opening of the lid 17 with respect to the base portion 110.

On the other hand, the second position P2 of the blade base 14 is optionally selected as long as a position of the fixing member 41 is away from the rotating member 42 by moving the blade base 14 from the first position P1. The second position P2 of the blade base 14 in one or more embodiments is a position after the blade base 14 has moved to scratch the surface of the optical fiber 100 using the blade member 13 by closing the lid 17 with respect to the base portion 110.

The fixing member 41 and the rotating member 42 may be directly engaged with each other, for example, but in one or more embodiments, the fixing member 41 and the rotating member 42 are engaged via a relay member 64 as shown in FIGS. 4 to 6, and 8. Similarly to the fixing member 41, the relay member 64 is rotatably fixed to the blade base 14. That is, the blade base 14 further includes the relay member 64. An axis of the relay member 64 is parallel to the axis A1 of the blade member 13.

The relay member 64 may be arranged to be aligned at least with respect to the rotating member 42 in the movement direction of the blade base 14 and may be arranged at an optional position with respect to the fixing member 41. In one or more embodiments, the relay member 64 is arranged on a lower side of the fixing member 41.

In the configuration described above, since the rotating member 42 is engaged with the relay member 64, rotation of the rotating member 42 is transmitted to the relay member 64 and thereby the relay member 64 rotates. Furthermore, the rotation of the relay member 64 is transmitted to the fixing member 41 and thereby the fixing member 41 rotates. That is, the blade member 13 rotates.

In the optical fiber cutter 1 of one or more embodiments, the blade base 14 further includes a manual operation rotating member 65 (hereinafter, referred to as an operation member 65). The operation member 65 is rotatably fixed to the blade base 14. The operation member 65 rotates the blade member 13 by power transmitted from rotation by a user (an operator handling the optical fiber cutter 1. That is, the operation member 65 is a member operated by a user with a finger to manually rotate the blade member 13. An axis of the operation member 65 is parallel to the axis A1 of the blade member 13.

In one or more embodiments, the operation member 65 rotates the fixing member 41 by engaging with the fixing member 41 (the blade member 13). The operation member 65, for example, may be directly engaged with the fixing member 41 or the rotating member 42, but in one or more embodiments, the operation member 65 is engaged with the fixing member 41 or the rotating member 42 via the relay member 64. The operation member 65 may be disposed at an optional position with respect to the fixing member 41 or the relay member 64 so as not to interfere with the rotating member 42. In one or more embodiments, the operation member 65 is disposed on the lower side of the fixing member 41 or the relay member 64.

The operation member 65 includes an operation portion 66 for operating with the user's fingers. The operation portion 66 is formed in a disk shape. A plurality of recesses 67 are formed on an outer circumference of the operation portion 66.

The plurality of recesses 67 are arranged at regular intervals in a circumferential direction of the operation portion 66. Each of the recesses 67 is formed in an arc shape as seen from the operation portion 66 in an axial direction. Thus, it is possible to fit a fingertip of the user in the recess 67, and the operation member 65 can be easily rotated with a finger.

In the configuration described above, when the user operates and rotates the operation member 65, the rotation of the operation member 65 is transmitted to the relay member 64 and thereby the relay member 64 rotates. Furthermore, the rotation of the relay member 64 is transmitted to the fixing member 41 and thereby the fixing member 41 rotates. That is, the blade member 13 rotates.

Figure 10:
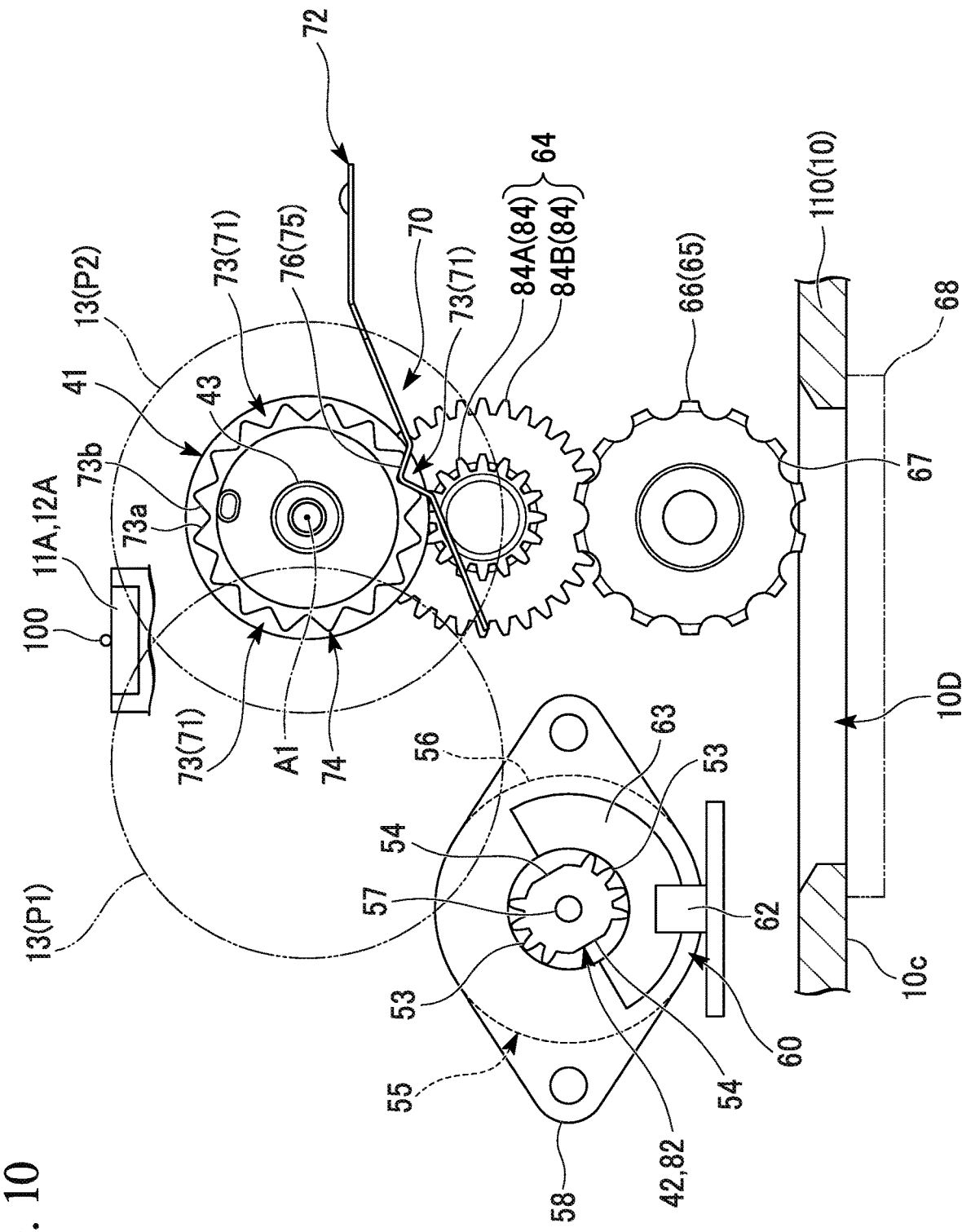
FIG. 10 is a side view showing a positional relation between the rotating member attached to the base and the blade member fixing member, the manual operation rotating member, and a relay member which are attached to the blade member moving base, in the configuration shown in FIG. 9.

As shown in FIGS. 2, 8, 10, similarly to the fixing member 41 and the rotating member 42, the operation member 65 is disposed inside the base portion 110. However, the operation member 65 (particularly, the operation portion 66) is exposed to the outside of the base portion 110 (base 10). That is, the base portion 110 further includes a window 10D through which the operation member 65 is exposed to the outside of the base portion 110. The window 10D may be provided only on the side surface 10b of the base portion 110, for example, or may be provided on both the side surface 10b and a bottom surface 10c of the base portion 110. That is, the operation member 65 may be exposed only on the side surface 10b of the base portion 110, for example, or may be exposed on both the side surface 10b and a bottom surface 10c of the base portion 110. In one or more embodiments, the window 10D is provided on the bottom surface 10c of the base portion 110. That is, the operation member 65 is exposed to the bottom surface 10c of the base portion 110. Here, the side surface 10b of the base portion 110 is a surface of the base portion 110 adjacent to the upper surface 10a of the base portion 110, and the bottom surface 10c of the base portion 110 is a surface of the base portion 110 facing opposite to the upper surface 10a of the base portion 110. In the shown example, the operation portion 66 of the operation member 65 does not protrude from the bottom surface 10c (outer surface) of the base portion 110, but may also protrude, for example.

In one or more embodiments, the operation member 65 of the blade base 14 always is exposed to the outside of the base portion 110 regardless of a position of the blade base 14 in the movement direction. That is, the operation member 65 is exposed to the outside of the base portion 110 whether the blade base 14 is disposed at the first position P1 or the second position P2.

In the optical fiber cutter 1 of one or more embodiments, the base portion 110 (the base 10) may further include a cover 68 that is used to prevent erroneous rotation which covers the operation member 65 exposed to the outside from the window 10D as shown in FIGS. 8 and 10, for example. The cover 68 may be disposed to cover only a portion of the window 10D, for example, but in the shown example, the cover 68 is disposed to close the entire window 10D. The cover 68 may be detachably attached to the base portion 110 or may be attached to the base portion 110 such that the window 10D of the base portion 110 is able to be opened and closed.

In addition, as shown in FIGS. 5, 6, 8 and 10, the optical fiber cutter 1 of one or more embodiments further includes a holding mechanism 70 (a latch mechanism) which holds at least one of the fixing member 41 (the blade member 13), the rotating member 42, the operation member 65, and the relay member 64 at a predetermined rotational position.

The holding mechanism 70 of one or more embodiments holds the fixing member 41 at a predetermined rotational position. The holding mechanism 70 is configured so that the fixing member 41 can rotate from a predetermined rotational position when a moving torque equal to or greater than a predetermined value acts on the fixing member 41.

The holding mechanism 70 is constituted by a plurality of locking portions 71 formed on an outer circumference of the fixing member 41 and a locked member 72 which is locked into any one of the locking portions 71 of the fixing member 41 by elastically being pressed against the outer circumference of the fixing member 41. The plurality of locking portions 71 are arranged at regular intervals in a circumferential direction of the fixing member 41. The number of locking portions 71 corresponds to the number of positions of the outer circumferential edge of the blade member 13 (a number in which the entire circumference of the outer circumferential edge is equally divided) to be in contact with the optical fiber 100. The number of locking portions 71 in one or more embodiments is 16.

When the locked member 72 is locked into any one of the locking portions 71, the fixing member 41 is held in a predetermined rotational position. Also, when a moving torque equal to or greater than a predetermined value acts on the fixing member 41, the locked member 72 moves against an elastic force of the locked member 72 and thereby a locked state between the locking portion 71 and the locked member 72 is released. Therefore, the fixing member 41 can rotate from the predetermined rotational position.

Hereinafter, the holding mechanism 70 of one or more embodiments will be more specifically described.

Each of the locking portions 71, for example, may be a projected portion protruding to the outside of the fixing member 41 in a radial direction, but in one or more embodiments, it is a recessed portion 73 that is open to the outside of the fixing member 41 in the radial direction.

The recessed portion 73 forming the locking portion 71 is formed in a V shape as seen from the fixing member 41 in an axial direction.

As shown in FIGS. 7A to 7C, 8, and 10, two inner side surfaces 73a and 73b of the recessed portion 73 are inclined in directions opposite to each other in the circumferential direction of the fixing member 41 with respect to the radial direction of the fixing member 41. Inclination angles of the two inner side surfaces 73a and 73b of the recessed portion 73 with respect to the radial direction of the fixing member 41 are equal to each other. An opening direction of the recessed portion 73 forming the locking portion 71 coincides with the radial direction of the fixing member 41. The plurality of locking portions 71 constitute a locking gear 74.

As shown in FIGS. 5, 6, 8, and 10, the locked member 72 is a leaf spring formed in a band plate shape. A first end portion in a longitudinal direction of the locked member 72 is fixed to the blade base 14. As shown in FIGS. 8 and 10, a locked portion 75 which is locked into the locking portions 71 of the fixing member 41 is formed at a second end portion in the longitudinal direction of the locked member 72.

The locked portion 75 may be a recessed portion into which the locking portion 71, which is a projected portion for example, can be inserted. The locked portion 75 of one or more embodiments is a projected portion 76 that can be inserted into the locking portion 71 which serves as the recessed portion 73. The projected portion 76 forming the locked portion 75 is formed by bending the leaf spring. The projected portion 76 may be formed in an arbitrary shape, but in one or more embodiments, it is formed in a V shape corresponding to the recessed portion 73 formed in the fixing member 41.

The projected portion 76 of the locked member 72 is inserted into the recessed portion 73 of the fixing member 41 in a state in which the locked member 72 is elastically bent and deformed. As a result, the locked portion 75 of the locked member 72 is elastically pressed against the outer circumference of the fixing member 41 by an elastic force of the locked member 72, and thereby the locked portion 75 is locked into the locking portion 71. In this state, when a moving torque equal to or greater than a predetermined value acts on the fixing member 41, the projected portion 76 of the locked member 72 is drawn out of the recessed portion 73 of the fixing member 41 against the elastic force of the locked member 72. Therefore, the locked state between the locking portion 71 and the locked portion 75 is released and the fixing member 41 can rotate from the predetermined rotational position.

In the holding mechanism 70 described above, a magnitude of the moving torque which allows the fixing member 41 to rotate from the predetermined rotational position, for example, can be adjusted by changing the elastic force of the locked member 72, the inclination angles of the inner side surfaces 73a and 73b of the recessed portion 73 of the fixing member 41, or the like.

Also, in the optical fiber cutter 1 of one or more embodiments, as shown in FIG. 4, an upper portion above the fixing member 41, the operation member 65, and the relay member 64 which are attached to the blade base 14 is covered with a cover portion 80. The cover portion 80 of one or more embodiments includes a first cover portion 80A, a second cover portion 80B, and a third cover portion 80C. The first cover portion 80A covers the fixing member 41 and a portion of the relay member 64 (particularly a first relay gear 84A to be described below) from above. The second cover portion 80B covers the remaining portion of the relay member 64 (particularly a second relay gear 84B to be described below) and a portion of the operation member 65 (particularly a gear 83 of the operation member 65 to be described below) from above. The third cover portion 80C covers the operation portion 66 of the operation member 65 from above. The cover portion 80 may be integrally formed with the blade base 14 as in the shown example, but it is not limited thereto.

Next, in the optical fiber cutter 1 of one or more embodiments, an engaging structure of the fixing member 41 (the blade member 13), the rotating member 42, the operation member 65, and the relay member 64 will be described more specifically with reference to FIGS. 4 to 10.

In one or more embodiments, the engaging structure of the fixing member 41, the rotating member 42, the operation member 65, and the relay member 64 (for example, an engaging structure between the fixing member 41 and the relay member 64, an engaging structure between the rotating member 42 and the relay member 64, and an engaging structure between the operation member 65 and the relay member 64) are configured using a gear. That is, the fixing member 41, the rotating member 42, the operation member 65, and the relay member 64 respectively have gears 81, 82, 83, and 84.

As shown in FIGS. 4 to 7, the gear 81 of the fixing member 41 (hereinafter, referred to as a rotation transmission gear 81) may be directly engaged with the gear 82 of the rotating member 42 or the gear 83 of the operation member 65, but in one or more embodiments, it is engaged with the gear 84 of the relay member 64. The rotation transmission gear 81 may be formed separately from the locking gear 74 of the holding mechanism 70 described above and then integrally fixed to each other, for example, but the rotation transmission gear 81 is integrally formed with the locking gear 74 in one or more embodiments. The rotation transmission gear 81 and the locking gear 74 are arranged in the axial direction of the fixing member 41.

The number of teeth of the rotation transmission gear 81 and the number of teeth of the locking gear 74 are optionally selected. In one or more embodiments, the number of teeth of the rotation transmission gear 81 is an integer multiple of the number of teeth of the locking gear 74. In the shown example, the number of teeth of the locking gear 74 is 16 and the number of teeth of the rotation transmission gear 81 is 32.

In the fixing member 41 of one or more embodiments, a partition wall 85 is formed between the rotation transmission gear 81 and the locking gear 74. The partition wall 85 prevents the gear 84 of the relay member 64 being engaged with the rotation transmission gear 81 from interfering with the locking gear 74 or prevents the locked member 72 (particularly the locked portion 75) being locked into the locking gear 74 from interfering with the rotation transmission gear 81.

In one or more embodiments, as shown in FIGS. 6 and 8 to 10, the gear 82 of the rotating member 42 engages with the gear 84 of the relay member 64. The gear 82 of the rotating member 42 may have a configuration in which teeth are arranged, for example, over the entire circumference of the rotating member 42. The gear 82 of the rotating member 42 in one or more embodiments has a configuration in which the teeth are formed in a portion of the rotating member 42 in the circumferential direction. That is, the gear 82 of the rotating member 42 in one or more embodiments is an intermittent gear.

In the gear 82 of the rotating member 42, a portion in which the teeth are formed corresponds to the engaging portion 53 described above and a portion in which the teeth are not formed corresponds to the non-engaging portion 54 described above. The number of teeth constituting the same engaging portion 53 is optionally selected, but in one or more embodiments, the number of teeth is four.

The gear 82 of the rotating member 42 does not engage with the gear 84 of the relay member 64 in a state in which the motor 55 is stopped. That is, the rotating member 42 is disposed so that the non-engaging portion 54 faces the gear 84 of the relay member 64, and thus the rotating member 42 is not in contact with the relay member 64. The gear 82 of the rotating member 42 engages with the gear 84 of the relay member 64 only when it is driven to be rotated by the motor 55.

In the rotating member 42 of one or more embodiments, as described above, the two engaging portions 53 are arranged at regular intervals in the circumferential direction of the rotating member 42. Therefore, each time the operation switch 59 is operated, the rotating member 42 is rotated 180 degrees due to a driving force of the motor 55 to stop at a rotational position at which it does not engage with the relay member 64. In addition, when the number of the engaging portions 53 is one, each time the operation switch 59 is operated, the rotating member 42 is rotated 360 degrees by the driving force of the motor 55 and stops at a rotational position at which it does not engage with the relay member 64.

In one or more embodiments, the gear 83 of the operation member 65 engages with the gear 84 of the relay member 64 as shown in FIGS. 4 and 6. The gear 83 of the operation member 65 may be formed separately from the above-described operation portion 66 and then fixed to each other, for example, but is integrally formed with the operation portion 66 in one or more embodiments. The gear 83 of the operation member 65 and the operation portion 66 are arranged in the axial direction of the operation member 65. The number of teeth of the gear 83 of the operation member 65 is optionally selected.

The number of gears 84 of the relay member 64 (hereinafter, referred to as a relay gears 84) may be one, for example, but the number is two in one or more embodiments as shown in FIGS. 4, 6, 8, and 10. The two relay gears 84 and 84 may be integrally formed, for example, but are formed separately and fixed to each other in one or more embodiments. The two relay gears 84 and 84 are arranged in an axial direction of the relay member 64.

A diameter and the number of teeth of the two relay gears 84 and 84 are different from each other. Of the two relay gears 84 and 84, a first relay gear 84A engages with the rotation transmission gear 81 of the fixing member 41.

A second relay gear 84B engages with the gear 82 of the rotating member 42 and the gear 83 of the operation member 65 at different positions from each other in the circumferential direction. In one or more embodiments, a diameter of the first relay gear 84A is smaller than a diameter of the second relay gear 84B, and the number of teeth of the first relay gear 84A is smaller than the number of teeth of the second relay gear 84B.

The specific number of teeth of the first relay gear 84A and the second relay gear 84B is optionally selected. In one or more embodiments, the number of teeth of the second relay gear 84B is an integer multiple of the number of teeth of the first relay gear 84A. In the shown example, the number of teeth of the first relay gear 84A is 16 and the number of teeth of the second relay gear 84B is 32.

Next, in the optical fiber cutter 1 of one or more embodiments, an example of an operation of changing a position of the outer circumferential edge of the blade member 13 to be in contact with the optical fiber 100 will be described.

In one or more embodiments, as shown in FIGS. 3, 5, 6, and 8, the blade member 13 can be rotated using the driving force of the motor 55 in a state in which the blade base 14 is disposed at the first position P1. In this case, a user may operate the operation switch 59 (see FIG. 1) provided on the base 10.

When the user operates the operation switch 59, the motor 55 drives the rotating member 42 to rotate. The motor 55 may rotate the rotating member 42 in either the clockwise direction or the counterclockwise direction.

In one or more embodiments, the motor 55 rotates the rotating member 42 by 180 degrees. The rotation of the rotating member 42 is transmitted to the fixing member 41 via the relay member 64. Here, since a moving torque of a predetermined value or more acts on the fixing member 41, the locked state between the locking portion 71 (one locking portion 71) of the fixing member 41 and the locked member 72 by the holding mechanism 70 is released. Therefore, the fixing member 41 and the blade member 13 rotate in a direction corresponding to the rotating direction of the rotating member 42.

Here, the engaging portion 53 of the rotating member 42 which engages with the relay member 64 is formed only in a portion in the circumferential direction of the rotating member 42. Therefore, the engaging portion 53 of the rotating member 42 temporarily engages with the relay member 64 while the rotating member 42 rotates 180 degrees so that the relay member 64 and the fixing member 41 engaged with the relay member 64 are rotated only by a predetermined angle. At this time, the predetermined angle by which the fixing member 41 rotates corresponds to the contact length of the blade member 13 to be in contact with the optical fiber 100 when the optical fiber 100 is scratched by the blade member 13. That is, when the rotating member 42 rotates 180 degrees, the blade member 13 can be rotated in units of angles corresponding to the contact length of the blade member 13.

In a state after the fixing member 41 and the blade member 13 have rotated as described above, the locked member 72 of the holding mechanism 70 is locked into another locking portion 71 adjacent to the one locking portion 71. That is, the fixing member 41 and the blade member 13 are held so as not to rotate by the holding mechanism 70. In addition, the rotating member 42 stops at a rotational position at which it does not engage with the relay member 64. That is, the rotating member 42 is disposed so that the non-engaging portion 54 thereof faces the relay member 64, and thus the power transmission between the blade member 13 and the rotating member 42 is released.

Also, in the optical fiber cutter 1 of one or more embodiments, as shown in FIGS. 3, 5, 6, and 8 to 10, whether the blade base 14 is disposed at the first position P1 or the second position P2, the blade member 13 can be manually rotated by operating the operation portion 66 of the operation member 65 by the user. The operation member 65 can be rotated in both clockwise and counterclockwise.

When the user rotates the operation member 65, the rotation of the operation member 65 is transmitted to the fixing member 41 via the relay member 64. Here, when a moving torque of a predetermined value or more acts on the fixing member 41, the locked state between the locking portion 71 (one locking portion 71) of the fixing member 41 and the locked member 72 due to the holding mechanism 70 is released. Therefore, the fixing member 41 and the blade member 13 rotate in a direction corresponding to the rotating direction of the operation member 65.

Thereafter, when the blade member 13 rotates in units of angles corresponding to the contact length thereof, the locked member 72 is locked into another locking portion 71 adjacent to the one locking portion 71 by its own elastic force and the fixing member 41 and the blade member 13 are held by the holding mechanism 70 so as not to rotate.

The user can ascertain that the blade member 13 has rotated in angle units corresponding to its contact length by sensing vibration or sound generated when the locked member 72 is locked into another locking portion 71 with the fingers and ears. In addition, the user can also ascertain the rotational position of the blade member 13 by visually checking the scale 52 formed on the hold-down member 47. That is, even when the blade member 13 is manually rotated, the blade member 13 can be rotated in units of angles corresponding to the contact length of the blade member 13.

As described above, when the blade member 13 is manually rotated, the rotating member 42 stops at a rotational position at which it does not engage with the relay member 64 as described above. Therefore, as shown in FIGS. 6 and 8, even when the blade base 14 is assumed to be disposed at the first position P1, the rotation of the operation member 65 is not transmitted from the relay member 64 to the rotating member 42. That is, even when the operation member 65 is rotated, it is possible to prevent load from being applied to the motor 55.

Furthermore, in one or more embodiments, when the user continuously operates the operation switch 59 or continues to rotate the operation member 65, the blade member 13 can be rotated by an angle corresponding to a length of an integer multiple (two times, three times, or the like) of the contact length. As a result, when there is a problem such as chipping in a particular region of the outer circumferential edge of the blade member 13, it is possible to simply skip over the particular region of the blade member 13 so that the particular region of the blade member 13 is not used for scratching the optical fiber 100.

As described above, according to the optical fiber cutter 1 of one or more embodiments, the blade member 13 is rotatably fixed to the blade base 14 and the rotating member 42 rotating the blade member 13 is rotatably fixed to the base 10. Thus, when the rotation of the blade member 13 is driven due to a driving source such as the motor 55, the driving source may be connected to the rotating member 42 provided in the base 10. That is, the driving source can be provided in the base portion 110 (the base 10). Therefore, it is possible to simplify a mechanism that rotates the blade member 13, such as by shortening wiring (electric wiring) connected to a driving source.

Also, deterioration in the driving source and the wiring can be minimized to a low level as compared with the case in which a driving source such as the motor 55 is provided in the blade base 14 which moves with respect to the base portion 110 (the base 10).

Furthermore, according to the optical fiber cutter 1 of one or more embodiments, a mechanism (transmission mechanism) that transmits a driving force of a driving source from the rotating member 42 to rotate the blade member 13 can be constituted only by rotating members. In one or more embodiments, the transmission mechanism is constituted only by the rotating members (the fixing member 41, the rotating member 42, the operation member 65, and the relay member 64). Therefore, as disclosed in Patent Document 1, for example, it is possible to appropriately prevent occurrence of problems in the transmission mechanism as compared with the case in which the above-described transmission mechanism includes a mechanism that converts rotational motion of a driving source into linear motion of an actuating pin or a mechanism that converts the linear motion of the actuating pin into rotational motion of a blade member. Also, the configuration of the transmission mechanism can be simplified as compared with the case in which the above-described motion conversion mechanism is included.

Also, in the optical fiber cutter 1 of one or more embodiments, the power transmission between the blade member 13 provided in the blade base 14 and the rotating member 42 provided in the base 10 can be released. Therefore, when the power transmission between the blade member 13 and the rotating member 42 is released, loading applied to the driving source such as the motor 55 can be prevented even when the blade member 13 is manually driven. That is, it is possible to protect the driving source.

In addition, even if problems occur in a driving source such as the motor 55, a power supply (a battery, for example) for driving the driving source, a control circuit, or the like, the blade member 13 can be manually rotated by releasing the power transmission between the blade member 13 and the rotating member 42.

Also, in the optical fiber cutter 1 of one or more embodiments, the power transmission between the blade member 13 and the rotating member 42 is possible only when the blade base 14 has moved to a predetermined position (the first position P1). Therefore, by disposing the blade base 14 at a position (the second position P2) other than the predetermined position, a load is not applied to a driving source such as the motor 55, and the blade member 13 can be manually driven even when problems occur in the driving source or the like.

In addition, in the optical fiber cutter 1 of one or more embodiments, the power transmission between the blade member 13 and the rotating member 42 is released according to the rotational position of the rotating member 42. Specifically, the rotating member 42 is configured to have the engaging portion 53 engaging with the fixing member 41 and a non-engaging portion 54 not engaging with the fixing member 41 which are arranged in the rotating direction of the rotating member 42. Thus, even when the blade base 14 is disposed at the first position P1, it is possible to switch between the engaged state in which the fixing member 41 and the rotating member 42 are engaged and the disengaged state in which they are not engaged according to the rotational position of the rotating member 42. That is, even when the blade base 14 is disposed at the first position P1, a load is not applied to the driving source connected to the rotating member 42, and the blade member 13 can be manually driven even when problems occur in the driving source or the like.

Furthermore, according to the optical fiber cutter 1 of one or more embodiments, power transmission between the blade member 13 and the rotating member 42 is released in a state in which a driving source such as the motor 55 is stopped. Specifically, the rotating member 42 is disposed such that the non-engaging portion 54 faces the relay member 64 or the fixing member 41. Therefore, the rotating member 42 is not in contact with the relay member 64 or the fixing member 41. Therefore, the blade member 13 can be rotated either manually or by driving using the driving source without performing an operation of switching the fixing member 41 and the rotating member 42 from the engaged state to the disengaged state (for example, an operation of moving the blade base 14 from the first position P1 to the second position P2).

Also, when the blade base 14 is moved from the second position P2 to the first position P1, collision of the rotating member 42 with the relay member 64 or the fixing member 41 can also be prevented. Therefore, it is possible to protect the rotating member 42 or the relay member 64 and the fixing member 41.

In addition, according to the optical fiber cutter 1 of one or more embodiments, the blade base 14 includes the operation member 65 which transmits power by rotation by the user to rotate the blade member 13. Also, the base 10 includes the window 10D through which the operation member 65 of the blade base 14 accommodated therein is exposed to the outside. Therefore, the blade member 13 can be manually rotated at a position away from the blade member 13. Therefore, when the blade member 13 is manually rotated, it is possible for the user to avoid touching the blade member 13 with hands.

Furthermore, when the operation member 65 is exposed on the bottom surface 10c or side surface 10b of the base portion 110 which faces in a direction different from the upper surface 10a of the base portion 110 on which the blade member 13 is exposed, it is possible for the user to avoid touching the blade member 13 with hands when the blade member 13 is manually rotated.

In addition, in the optical fiber cutter 1 of one or more embodiments, when the base 10 includes the cover 68 that is used to prevent erroneous rotation which covers the operation member 65 of the blade base 14 accommodated therein, it is possible to prevent unexpected rotation of the blade member 13 due to an external force acting on the operation member 65 unexpectedly.

In addition, the optical fiber cutter 1 of one or more embodiments includes the holding mechanism 70 which holds the fixing member 41 at a predetermined rotational position. Therefore, unexpected rotation of the blade member 13 can be suppressed.

Also, the holding mechanism 70 of one or more embodiments includes the plurality of locking portions 71 arranged on the outer circumference of the fixing member 41 and the locked member 72 elastically pressed against the outer circumference of the fixing member 41 to be locked into any one of the locking portions 71. Furthermore, when a moving torque equal to or greater than a predetermined value acts on the fixing member 41, the locked state between the locking portion 71 and the locked member 72 is released. As a result, the fixing member 41 and the blade member 13 can be rotated by causing the moving torque of a predetermined value or more to act on the fixing member 41. Also, the blade member 13 can be held at a plurality of rotational positions.

Furthermore, when the blade member 13 is manually rotated, the user can sense vibration or sound generated when the locked member 72 is locked into another locking portion 71 with the fingers and ears. Therefore, the user can recognize, by the feel of the fingers or the like, that the rotational position of the blade member 13 has changed.

The above-described effects related to the holding mechanism 70 can be similarly obtained even when the holding mechanism 70 is configured to hold the rotating member 42, operation member 65, and the relay member 64 at predetermined rotational positions.

Also, in the optical fiber cutter 1 of one or more embodiments, the number of teeth of the rotation transmission gear 81 in the fixing member 41 is an integer multiple of the number of teeth of the locking gear 74, and the number of teeth of the first relay gear 84A is an integer multiple of the number of teeth of the second relay gear 84B in the relay member 64. Therefore, even when the gear 82 of the rotating member 42 and the second relay gear 84B are not always engaged, in a state in which the locked member 72 is locked into the locking portions 71 of the locking gear 74, the second relay gear 84B can be disposed at a rotational position in which the gear 82 of the rotating member 42 and the second relay gear 84B are appropriately engaged (a position in which the teeth of the gear 82 of the rotating member 42 can smoothly enter between the teeth of the second relay gear 84B).

As a result, when the gear 82 of the rotating member 42 rotates, tips of the teeth of the gear 82 of the rotating member 42 and tips of the teeth of the second relay gear 84B can be prevented from colliding with each other. It is possible to prevent the rotating member 42 and the relay member 64 from being unable to rotate due to collision between the tips of the teeth of the gear 82 of the rotating member 42 and the tips of the teeth of the second relay gear 84B.

Also, even when the engaging portion 53 of the rotating member 42 is disposed to face the gear 84 of the relay member 64 in a state in which the motor 55 is stopped, when the blade base 14 moves from the second position P2 to the first position P1, it is possible to prevent the tips of the teeth of the gear 82 of the rotating member 42 and the tips of the teeth of the second relay gear 84B from colliding with each other.

Therefore, it is also possible to protect the gear 82 of the rotating member 42 and the second relay gear 84B.

In addition, according to the optical fiber cutter 1 of one or more embodiments, the upper portion above the fixing member 41, the operation member 65, and the relay member 64 which are attached to the blade base 14 is covered with the cover portion 80. Therefore, it is possible to suitably prevent foreign matter from reaching the fixing member 41, the operation member 65, and the relay member 64. Particularly, fiber debris generated when a surface of the optical fiber 100 is scratched using the blade member 13 above the fixing member 41, the operation member 65, and the relay member 64 can be suitably prevented from reaching the fixing member 41, the operation member 65, and the relay member 64. As a result, it is possible to prevent occurrence of problems due to foreign matters such as the optical debris in the engagement states of the fixing member 41, the rotating member 42, the operation member 65, and the relay member 64. Therefore, it is possible to prevent transmission of the rotation from the rotating member 42 or the operation member 65 to the fixing member 41 from being disturbed by foreign matters.

While details of the invention have been described above, the invention is not limited to the embodiments described above and various modifications can be made without departing from the scope of the invention.

Figure 11:
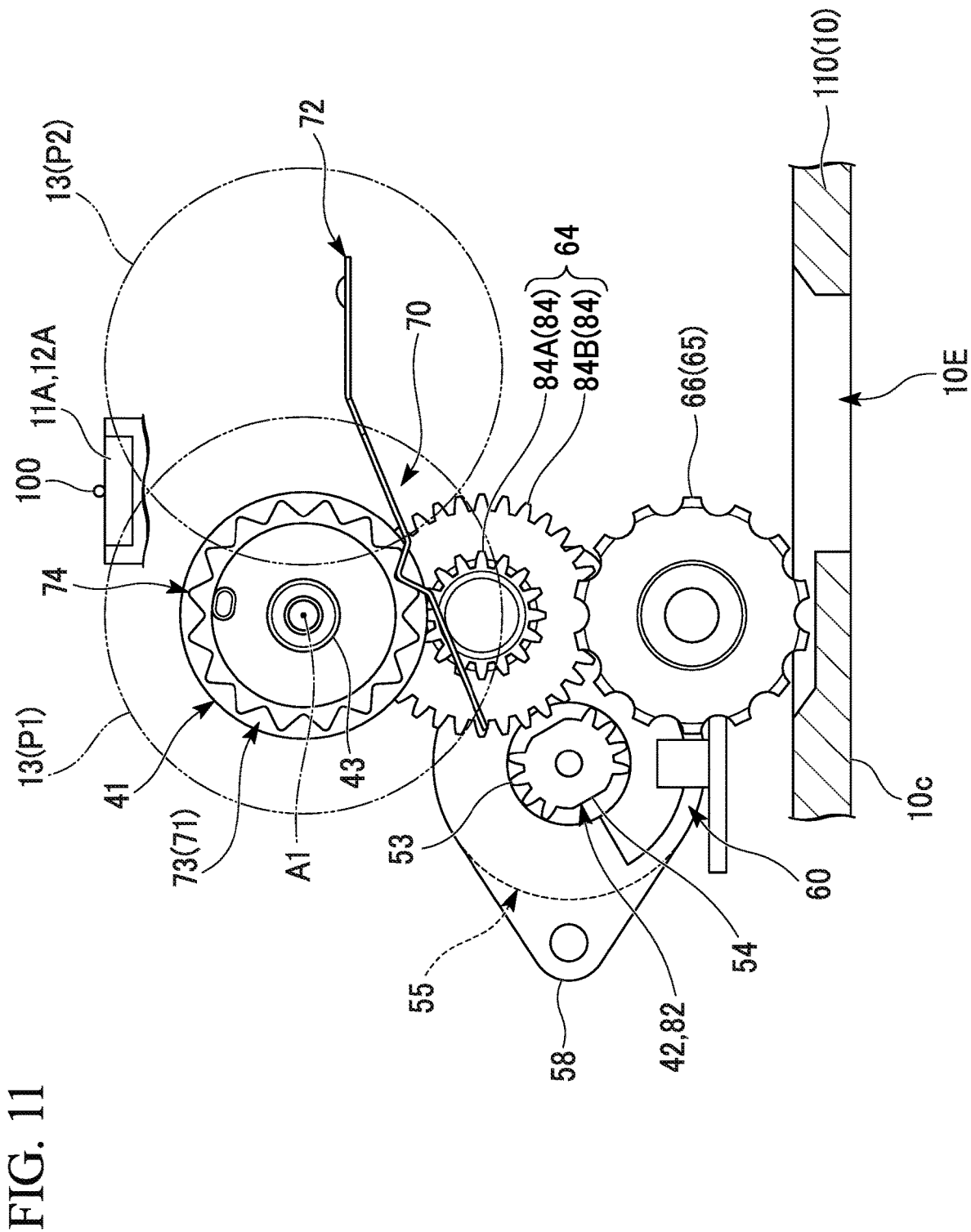
FIG. 11 is a side view showing a state in which a blade member moving base is disposed at a first position in an optical fiber cutter according to one or more embodiments of the invention.
Figure 12:
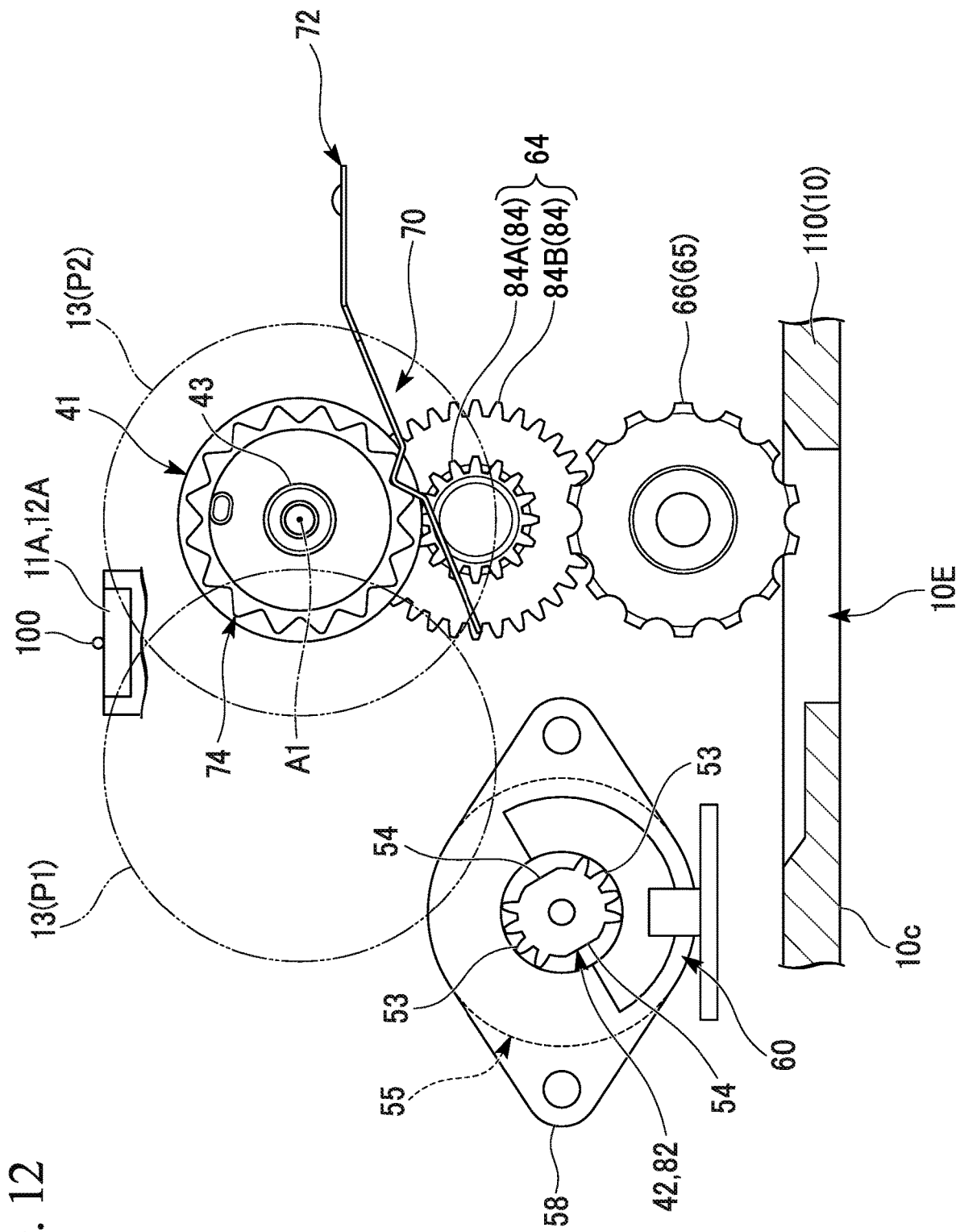
FIG. 12 is a side view showing a state in which a blade member moving base is disposed at a second position in the optical fiber cutter of FIG. 11.

In one or more embodiments of the optical fiber cutter of the invention, an operation member may be exposed to the outside from a window of a base, for example, only when a blade base is moved to a predetermined position. For example, as shown in FIGS. 11 and 12, the operation member 65 may not be exposed to the outside from a window 10E of the base portion 110 (the base 10) in a state in which the blade base 14 (the blade member 13) is disposed at the first position P1, and may be exposed from the window 10E of the base portion 110 in a state in which the blade base 14 (the blade member 13) is disposed at the second position P2. Also, the operation member 65, for example, may not be exposed to the outside from the window 10E of the base portion 110 in a state in which the blade base 14 (the blade member 13) is disposed at the second position P2, and may be exposed from the window 10E of the base portion 110 in a state in which the blade base 14 (the blade member 13) is disposed at the first position P1.

As described above, in order to expose the operation member 65 to the outside from the window 10E of the base portion 110 (the base 10), for example, the size of the window 10E of the base portion 110 may be adjusted. Specifically, a length of the window 10E of the base portion 110 in the movement direction of the blade base 14 may be shorter than the window 10D of the base portion 110 of one or more the above-described embodiments shown in FIGS. 8 and 10. Also, in order to expose the operation member 65 to the outside of the base portion 110 as described above, for example, a cover covering only a portion of the window 10D of the base portion 110 shown in FIGS. 8 and 10 may be provided in the base portion 110.

When the operation member 65 is exposed to the outside from the window 10E (the window 10D) of the base 10 only when the blade base 14 is disposed at a predetermined position, it is possible to prevent unexpected rotation of the blade member 13 due to an external force acting on the operation member 65 unexpectedly when the blade base 14 is disposed at a position other than the predetermined position.

Also, when the operation member 65 is exposed to the outside of the base portion 110 only when the blade base 14 is disposed at the second position P2 in which the fixing member 41 and the rotating member 42 are not engaged with each other, when the blade member 13 is rotated by operating the operation member 65, it is possible to reliably prevent the rotating member 42 from rotating and applying a load to a driving source such as the motor 55.

One or more embodiments of the optical fiber cutter of the invention may include a rotation restricting mechanism (a ratchet mechanism) which, for example, restricts rotation in one rotational direction (a first rotational direction) of at least any one member (a rotatable member) from a blade member (a fixing member), a rotating member, an operation member, and a relay member which are rotatable, and allows rotation in the other rotational direction (a second rotational direction).

Figure 13:
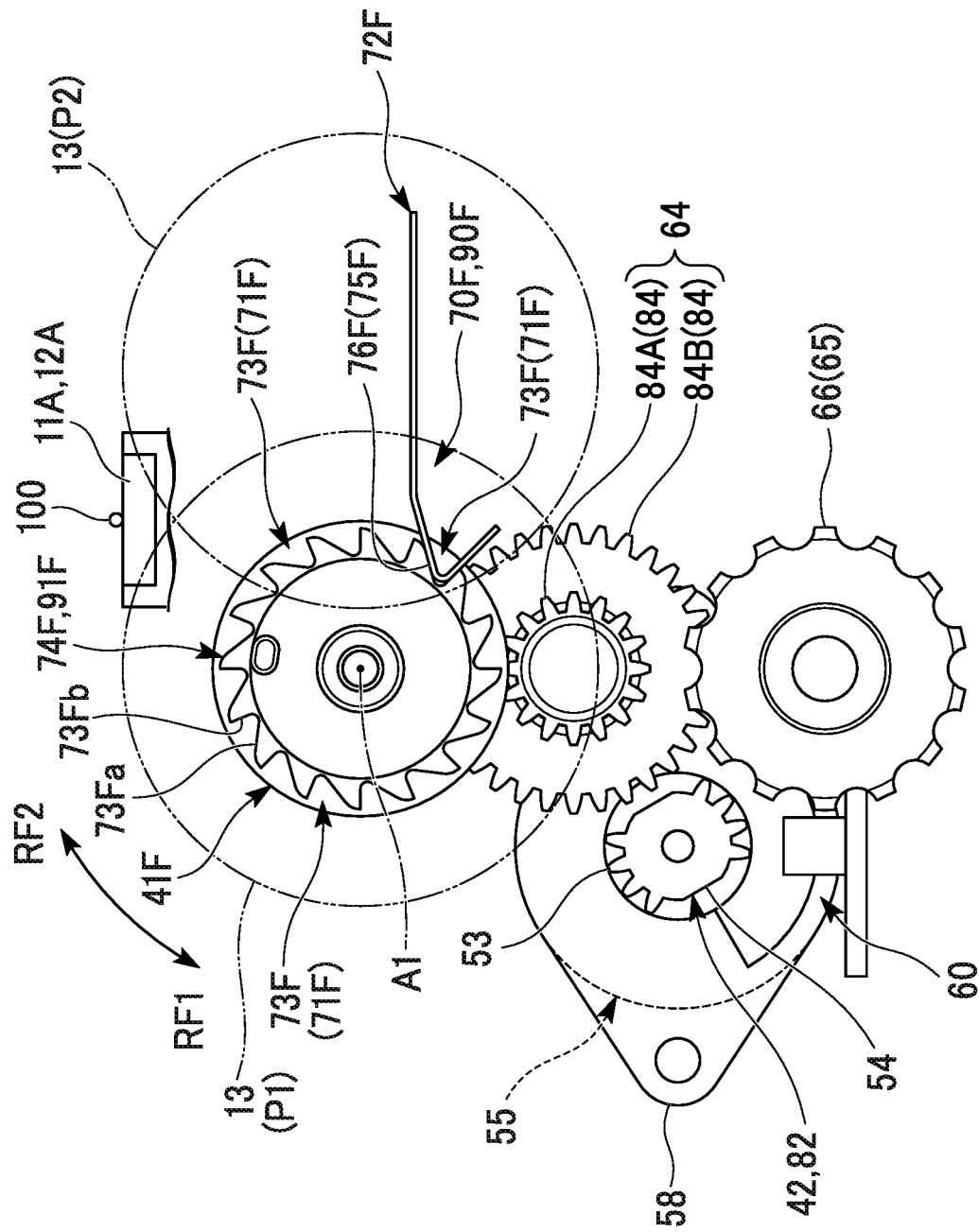
FIG. 13 is a side view showing a state in which a blade member moving base is disposed at a first position in an optical fiber cutter according to one or more embodiments of the invention.

The rotation restricting mechanism, for example, may be provided separately from a holding mechanism, or may be included in a holding mechanism 70F as shown in FIG. 13, for example.

In the holding mechanism 70F shown in FIG. 13, an opening direction of a recessed portion 73F forming locking portions 71F of a locking gear 74F is inclined in a first rotational direction RF1 (counterclockwise in FIG. 13) relative to the radial direction of a fixing member 41F (a rotatable member). Specifically, a front inner side surface 73Fa positioned on the front side in the first rotational direction RF1 of the two inner side surfaces 73Fa and 73Fb of the recessed portion 73F formed in a V shape is greatly inclined toward the first rotational direction RF1 relative to the radial direction of the fixing member 41F. The rear inner side surface 73Fb positioned on the rear side in the first rotational direction RF1 of the recessed portion 73F, for example, may extend in the radial direction of the fixing member 41F without being inclined with respect to the radial direction of the fixing member 41F. Also, for example, the rear inner side surface 73Fb may be inclined toward the first rotational direction RF1 at an inclination angle smaller than that in the front inner side surface 73Fa with respect to the radial direction of the fixing member 41F. That is, the locking gear 74F of the holding mechanism 70F constitutes a ratchet gear 91F. A projected portion 76F forming a locked portion 75F of the locked member 72F in the holding mechanism 70F may be formed in an arbitrary shape as long as it can be inserted into the recessed portion 73F forming the locking portions 71F, but in the shown example, it is formed in a V shape corresponding to the shape of the recessed portion 73F.

In the holding mechanism 70F with the configuration as described above, rotation of the blade member 13 in a second rotational direction RF2 (clockwise in FIG. 13) is allowed, and the rotation in the first rotational direction RF1 is restricted. That is, the holding mechanism 70F shown in FIG. 13 includes a rotation restricting mechanism 90F.

Since the rotation restricting mechanism 90F described above is provided in the optical fiber cutter, it is possible to prevent a particular region of an outer circumferential edge of the blade member 13 worn out by scratching the surface of the optical fiber 100 from being erroneously used again for scratching the surface of the optical fiber 100.

In one or more embodiments of the optical fiber cutter of the invention, the mutual engagement structure of the blade member (fixing member), the rotating member, the operation member, and the relay member is not limited to such a configuration using gears, but may also be a configuration using a friction wheel, a belt, or the like, for example.

In one or more embodiments of the optical fiber cutter of the invention, power transmission between the blade member (fixing member) or the operation member and the rotating member may be released, for example, when a torque acting on the blade member or the operation member reaches a predetermined position or more. That is, one or more embodiments of the optical fiber cutter of the invention may include a torque limiter which releases the power transmission between the blade member or the operation member and the rotating member when the torque acting on the blade member or the operation member is equal to or greater than a predetermined position. The torque limiter, for example, may utilize a frictional force or may utilize a magnetic force.

When the torque limiter utilizes a frictional force, for example, the torque limiter may have a configuration in which the rotating member and the relay member or the blade member (fixing member) are engaged by frictional force, or may have a configuration in which the operation member and the relay member or the blade member (fixing member) are engaged by frictional force. In addition, when the blade member (fixing member) and the operation member are engaged by being connected by a belt wound therearound, the torque limiter utilizing a frictional force may have a configuration in which the rotating member and the belt are engaged by the frictional force, for example.

When the torque limiter utilizes a magnetic force, the torque limiter may be a magnetic coupling provided in the blade member (fixing member) or the operation member, the rotating member, and the relay member, for example.

In a case in which the torque limiter described above is provided in the optical fiber cutter, even when the blade base is disposed at the first position and the blade member (the fixing member) or the operation member and the rotating member are engaged with each other, in a case in which a moving torque acting on the blade member (the fixing member) or the operation member is equal to or greater than a predetermined value, rotation of the blade member (the fixing member) or the operation member can be prevented from being transmitted to the rotating member. As a result, when the blade member (the fixing member) or the operation member is manually driven, a load applied to a driving source such as the motor connected to the rotating member can be reduced and thereby the driving source can be protected. Particularly, when the above-described predetermined value is set to be equal to or less than a torque required for the rotation of a shaft portion (motor shaft portion) of the driving source such as the motor, it is possible to prevent the shaft portion of the driving source from rotating when the blade member (the fixing member) or the operation member is manually rotated. Therefore, the driving source can be reliably protected. Also, even when a problem occurs in the driving source or the like, it is possible to manually rotate the blade member.

Furthermore, when the torque limiter is provided in the optical fiber cutter, it is possible to rotate the blade member either manually or by driving using a driving source without performing an operation of releasing power transmission between the blade member (the fixing member) or the operation member and the rotating member (an operation of moving the blade base from the first position to the second position, for example).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERAL 1 optical fiber cutter
10 base
10a upper surface
10b side surface
10c bottom surface
10D, 10E window
11, 12 clamps
11A, 12A lower clamp
11B, 12B upper clamp
13 blade member
14 blade base (blade member moving base)
15 pressing member
17 lid
41, 41f fixing member (blade member fixing member)
42 rotating member
53 engaging portion
54 non-engaging portion
55 motor (driving source)
64 relay member
65 operation member (manual operation rotating member)
68 cover
70, 70F holding mechanism
71, 71F locking portion
72, 72F locked member
73, 73F recessed portion
74, 74F locking gear
75, 75F locked portion
76, 76F projected portion
81 rotation transmission gear (gear of fixing member 41)
82 gear of rotating member 42
83 gear of operation member 65
84 relay gear (gear of relay member 64)
84A first relay gear
84B second relay gear
90F rotation restricting mechanism
91F ratchet gear
100 optical fiber
110 base portion

The invention claimed is:

1. An optical fiber cutter comprising:
a base that includes a pair of clamps disposed with an interval therebetween in a longitudinal direction of an optical fiber;
a blade member moving base that:
   includes a disk-shaped blade member and a blade shaft,
   moves the blade member between the pair of clamps, and
   brings an outer circumferential edge of the blade member into contact with a surface of the optical fiber to scratch the surface of the optical fiber; and
a pressing that press-bends a scratched portion of the optical fiber to cut the optical fiber,
wherein
   the blade member is rotatable around the blade shaft that is fixed to the blade member moving base to change a position of the outer circumferential edge to be in contact with the optical fiber,
   the base further includes a rotating member that rotates about an axis, the axis is fixed with respect to the base, and the blade shaft is movable with respect to the axis,
   the rotating member is engageable with the blade member,
   the blade member is driven by a 360 degree rotation of the rotating member in a state where the rotating member is coupled to the blade member,
   engagement between the blade member and the rotating member is releasable,
   the rotating member includes an engaging portion that drives the blade member and a non-engaging portion that does not drive the blade member, and
   the engaging portion and the non-engaging portion are arranged in a rotating direction of the rotating member.

2. The optical fiber cutter according to claim 1, wherein power transmission between the blade member and the rotating member is possible only when the blade member moving base has moved to a predetermined position.

3. The optical fiber cutter according to claim 1, wherein power transmission between the blade member and the rotating member is released according to a rotational position of the rotating member.

4. The optical fiber cutter according to claim 1, wherein power transmission between the blade member and the rotating member is released when a torque acting on the blade member is equal to or greater than a predetermined value.

5. The optical fiber cutter according to claim 1, wherein the rotating member is rotated by an electromagnetic force.

6. The optical fiber cutter according to claim 1, wherein the blade member moving base further includes a manual operation rotating member that is rotatable around an axis that is fixed with respect to the blade member moving base and transmits power by rotation by a user to rotate the blade member, and
the base further includes a window through which the manual operation rotating member of the blade member moving base accommodated therein is exposed to the outside.

7. The optical fiber cutter according to claim 6, wherein the window is provided on a bottom surface or a side surface of the base.

8. The optical fiber cutter according to claim 6, wherein the base further includes an erroneous rotation prevention cover that covers the manual operation rotating member.

9. The optical fiber cutter according to claim 6, wherein the manual operation rotating member is exposed from the window to the outside only when the blade member moving base has moved to a predetermined position.

10. The optical fiber cutter according to claim 1, further comprising a holding mechanism that holds at least one of the blade member and the rotating member at a predetermined rotational position.

11. The optical fiber cutter according to claim 6, further comprising a holding mechanism that holds at least one of the blade member, the rotating member, and the manual operation rotating member at a predetermined rotational position.

\* \* \* \* \*